(12) United States Patent
Seol et al.

(10) Patent No.: US 10,431,888 B2
(45) Date of Patent: Oct. 1, 2019

(54) COMMUNICATION METHOD AND DEVICE USING BEAMFORMING IN WIRELESS COMMUNICATION SYSTEM

(71) Applicant: Samsung Electronics Co., Ltd., Gyeonggi-do (KR)

(72) Inventors: Ji-Yun Seol, Gyeonggi-do (KR); Tae-Young Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 423 days.

(21) Appl. No.: 14/418,902

(22) PCT Filed: Jul. 31, 2013

(86) PCT No.: PCT/KR2013/006892
§ 371 (c)(1),
(2) Date: Jan. 30, 2015

(87) PCT Pub. No.: WO2014/021633
PCT Pub. Date: Feb. 6, 2014

(65) Prior Publication Data
US 2016/0006122 A1    Jan. 7, 2016

(30) Foreign Application Priority Data

Jul. 31, 2012  (KR) .................... 10-2012-0083625

(51) Int. Cl.
*H01Q 3/30*       (2006.01)
*H04B 7/0408*     (2017.01)
(Continued)

(52) U.S. Cl.
CPC ................ *H01Q 3/30* (2013.01); *H01Q 3/24* (2013.01); *H04B 7/0408* (2013.01);
(Continued)

(58) Field of Classification Search
CPC .. H01Q 3/30; H01Q 3/24; H01Q 3/40; H01Q 1/246; H01Q 3/00; H04B 7/0408;
(Continued)

(56) References Cited

U.S. PATENT DOCUMENTS 5,615,409 A     3/1997  Forssen et al.
6,181,955 B1 *  1/2001  Dartois ............... H01Q 3/2682
                                                         342/368
(Continued)

FOREIGN PATENT DOCUMENTS

CN       1116024 A     1/1996
JP       H09200115 A   7/1997
(Continued)

OTHER PUBLICATIONS

Extended European Search Report issued for EP 13825425.5 dated Mar. 15, 2016, 8 pgs.
(Continued)

*Primary Examiner* — Bernarr E Gregory
*Assistant Examiner* — Nuzhat Pervin

(57) ABSTRACT

A communication method and device using beamforming in a wireless communication system are disclosed. A base station determines according to a predetermined trigger condition and a channel state of a terminal whether to enable a beam overlap mode using an overlap beam in which a plurality of unitary beams of the base station are overlapped, selects one or more best beams from among the plurality of unitary beams if it is determined that the beam overlap mode is not enabled, and transmits or receives a signal for the terminal through the selected best beams. If it is determined that the beam overlap mode is enabled, the base station forms the overlap beam in which the plurality of unitary beams of the base station are overlapped by adjusting beamforming coefficients of a beamforming unitary and
(Continued)

transmits or receives a signal for the terminal through the overlap beam.

18 Claims, 13 Drawing Sheets

(51) Int. Cl.
  *H04L 1/00* (2006.01)
  *H01Q 3/24* (2006.01)
  *H04B 7/06* (2006.01)
  *H04L 1/06* (2006.01)
(52) U.S. Cl.
  CPC ......... *H04B 7/0617* (2013.01); *H04L 1/0006* (2013.01); *H04L 1/0026* (2013.01); *H04L 1/06* (2013.01)
(58) Field of Classification Search
  CPC .. H04B 7/0617; H04B 7/0689; H04B 7/0417; H04B 14/026; H04B 7/024; H04L 1/0006; H04L 1/0026; H04L 1/06; H04L 27/3488; H04L 5/023; H04W 52/34; H04W 72/046; G01S 3/023
  USPC ........................................................ 342/372
  See application file for complete search history.

(56) References Cited

U.S. PATENT DOCUMENTS

| | | | | |
|---|---|---|---|---|
| 7,684,761 B2* | 3/2010 | Hottinen | ............... | H04B 7/0417 375/146 |
| 7,706,456 B2* | 4/2010 | Laroia | ................. | H04B 14/026 375/260 |
| 8,041,313 B2* | 10/2011 | Van Rensburg | ......... | H01Q 3/40 455/562.1 |
| 8,520,537 B2* | 8/2013 | van Rensburg | ........ | H01Q 1/246 342/368 |
| 8,565,153 B2* | 10/2013 | Zhang | ................. | H04W 72/048 370/328 |
| 8,593,932 B2* | 11/2013 | Laroia | .................... | H04L 5/023 370/203 |
| 8,843,150 B2* | 9/2014 | Yu | ....................... | H04W 72/046 370/334 |
| 9,831,548 B2* | 11/2017 | Timofeev | ............... | H01Q 1/246 |
| 2005/0070331 A1 | 3/2005 | Higuchi et al. | | |
| 2006/0002287 A1 | 1/2006 | Kuwahara et al. | | |
| 2006/0056316 A1* | 3/2006 | Chandra | .............. | H04B 7/0689 370/254 |
| 2007/0010177 A1 | 1/2007 | Steckling | | |
| 2007/0049218 A1* | 3/2007 | Gorokhov | ............ | H04B 7/0417 455/102 |
| 2007/0270170 A1* | 11/2007 | Yoon | ................... | H04L 27/3488 455/509 |
| 2008/0188256 A1* | 8/2008 | Wu | ....................... | H04W 52/34 455/522 |
| 2009/0253387 A1* | 10/2009 | Van Rensburg | ......... | H01Q 3/40 455/90.2 |
| 2011/0299460 A1* | 12/2011 | Tarokh | ................... | H01Q 1/246 370/328 |
| 2011/0316744 A1 | 12/2011 | Morioka et al. | | |
| 2012/0033761 A1* | 2/2012 | Guo | ........................ | G01S 3/023 375/316 |
| 2012/0113897 A1* | 5/2012 | Thiele | .................... | H04B 7/024 370/328 |
| 2012/0162009 A1* | 6/2012 | Kim | ........................ | H01Q 3/00 342/372 |

FOREIGN PATENT DOCUMENTS

| | | | | |
|---|---|---|---|---|
| JP | 2000102065 A | 4/2000 | | |
| JP | 2001-511969 A | 8/2001 | | |
| JP | 2005064546 A | 3/2005 | | |
| JP | 2006005874 A | 1/2006 | | |
| JP | 2006019846 A | 1/2006 | | |
| JP | 2008-547283 A | 12/2008 | | |
| JP | 2008547283 A | * 12/2008 | | |
| JP | 2009-506729 A | 2/2009 | | |
| JP | 2010212804 A | 9/2010 | | |
| KR | 10-2009-0120008 | 11/2009 | | |
| KR | 10-2011-0075182 | 7/2011 | | |
| KR | 10-2011-0127106 | 11/2011 | | |
| KR | 20110127106 A | * 11/2011 | ........... | H04B 7/0408 |
| KR | 10-2012-0072938 | 7/2012 | | |
| KR | 20140016854 A | * 2/2014 | ........... | H04B 7/0408 |
| KR | 20140016854 A | * 2/2014 | ........... | H04B 7/0408 |
| RU | 2315332 C1 | 1/2008 | | |
| WO | 2005053182 A1 | 6/2005 | | |
| WO | 2009041759 A | 4/2009 | | |
| WO | 2011084234 A2 | 7/2011 | | |

OTHER PUBLICATIONS

Tsuchiya et al., "Scheduling Algorithm With Power Allocation for Random Unitary Beamforming", IEICE Trans. Commun., VI E91-B, No. 1 Jan. 1, 2008, 7 pgs.

Japanese Office Action for Japanese Application No. 2015-535355, dated Jul. 3, 2017. (10 pages).

International Search Report dated Nov. 11, 2013 in connection with International Patent Application No. PCT/KR2013/006892, 5 pages.

Written Opinion of the International Searching Authority dated Nov. 11, 2013 in connection with International Patent Application No. PCT/KR2013/006892, 5 pages.

Foreign Communication From a Related Counterpart Application, Chinese Application No. 201380041128.6, Text of the First Office Action dated Feb. 16, 2017, 17 pages.

Foreign Communication From a Related Counterpart Application, Russian Application No. 2015106981(011229), Russian Office Action dated Mar. 15, 2017, 11 pages.

Japan Patent Office, "Notification of Reason for Rejection," Application No. JP2018-132551, dated Jun. 10, 2019, 7 pages.

* cited by examiner

COMMUNICATION METHOD AND DEVICE USING BEAMFORMING IN WIRELESS COMMUNICATION SYSTEM

CROSS-REFERENCE TO RELATED APPLICATION(S)

The present application claims priority under 35 U.S.C. § 365 to International Patent Application No. PCT/KR2013/006892 filed Jul. 31, 2013, entitled "COMMUNICATION METHOD AND DEVICE USING BEAMFORMING IN WIRELESS COMMUNICATION SYSTEM". International Patent Application No. PCT/KR2013/006892 claims priority under 35 U.S.C. § 365 and/or 35 U.S.C. § 119(a) to Korean Patent Application No. 10-2012-0083625 filed Jul. 31, 2012, and which are incorporated herein by reference into the present disclosure as if fully set forth herein.

TECHNICAL FIELD

The present disclosure relates to transmission/reception of a signal in a communication system, and more particularly to a method and an apparatus for trnasmitting/receiving a signal through a plurality of beams in a beamforming-based wireless mobile communication system.

BACKGROUND ART

A wireless communication system has been developed in the direction of supporting a higher data transmission rate so as to meet wireless data traffic demands which have continuously increased. A conventional wireless communication system sought to develop a technology that mainly improves a spectral efficiency to increase the data transmission rate. However, due to increased demand for smart phones and tablet PCs and an explosive increase in application programs which require a large amount of traffic based on the increased demand, demand for data traffic has accelerated rapidly. Accordingly, it is difficult to meet the heavy increase in wireless data traffic demand through a frequency efficiency improvement technology alone.

One method to solve the above problem is to use a very wide frequency band. In a frequency band below 10 GHz which is used for a convention mobile communication cellular system, it is very difficult to secure a wide frequency band. Accordingly, securing a broadband frequency in a higher frequency band is required. However, as a transmission frequency for wireless communication becomes higher, propagation path loss increases. Therefore, a distance of arrival becomes shorter, which results in a coverage decrease. One of the main technologies to alleviate the propagation path loss and increase the distance of arrival in order to solve the above problem is a beamforming technique.

Beamforming may be divided into transmission beamforming which is performed by the transmitting side and reception beamforming which is performed by the receiving side. Transmission beamforming generally uses a plurality of antennas and concentrates signals transmitted from respective antennas in a particular direction (that is, space), so as to increase directivity. A set of a plurality of antennas is referred to as an array antenna, and an antenna included in the array antenna is referred to as an antenna element or an array element. The antenna array may be configured in various types such as a linear array and a planar array. When the transmission beamforming is used, the distance of arrival can be increased through a signal directivity increase, and the signal is not transmitted in any direction other than the corresponding direction. As a result, interference influencing another user can be significantly reduced.

The receiving side may perform the reception beamforming by using a reception array antenna. The reception beamforming concentrates received radio waves to be directed in a particular direction, increases sensitivity of signals received from the particular direction, and excludes signals received from another direction, so as to block interference signals.

In order to secure the wide frequency band, a super high frequency, that is, a millimeter (mm) wave system is introduced. As the transmission frequency becomes higher, the wavelength of a radio wave becomes shorter. Accordingly, when antennas are configured at half wavelength intervals, an array antenna may be formed by a larger number of antennas within the same area. That is, a communication system operating at an ultra high frequency band is well positioned to apply the beamforming technique because the communication system can acquire a relatively higher antenna gain in comparison with using the beamforming technique at a low frequency band.

Through the use of the beamforming technique, a performance index such as a Signal to Noise Ratio (SNR) can be optimized by maximizing a beamforming gain, but a diversity gain cannot be obtained since a multipath propagation is reduced. Further, performance sensitivity for the beamforming may be generated due to beam information mismatching according to a delay until an actual allocation after mobility or a channel condition of a Mobile Station (MS) and beam are measured/selected.

Accordingly, the conventional research was limited to determining beamforming weight coefficients for optimizing a performance index such as a received SNR by maximizing a beamforming gain when applying the beamforming.

DETAILED DESCRIPTION OF THE DISCLOSURE

Technical Problem

The present disclosure provides a method and an apparatus for transmitting/receiving information in a communication system.

The present disclosure provides a method and an apparatus for superposing a plurality of beams in a wireless communication system using beamforming.

The present disclosure relates to a method and an apparatus for superposing adjacent beams in a plurality of directions in a beamforming-based mobile communication system which operates beams having specific beam characteristics as a basic unit.

The present disclosure provides a method and an apparatus for superposing beams in a plurality of directions to operate the beams as one superposed beam in a hybrid beamforming structure including a combination of analog and digital beamforming.

The present disclosure provides a method and an apparatus for superposing a plurality of beams based on estimation of mobility of a user and a variation characteristic of a channel state in a beamforming-based wireless mobile communication system.

Technical Solution

In accordance with an aspect of the present disclosure, a method of transmitting a signal using beamforming in a wireless communication system is provided. The method includes: determining whether to enable a beam superposition mode using a superposed beam generated by superposing a plurality of unitary beams of a first node according to a predetermined trigger condition and a channel state of a second node; selecting one or more best beams from the plurality of unitary beams when there is a determination not to enable the beam superposition mode; transmitting a signal for the second node through the selected best beam; controlling a beamforming unit of the first node to form a superposed beam generated by superposing the plurality of unitary beams when there is a determination to enable the beam superposition mode; and transmitting the signal for the second node through the superposed beam.

In accordance with another aspect of the present disclosure, an apparatus for transmitting a signal using beamforming in a wireless communication system is provided. The apparatus includes: a beamforming controller for determining whether to enable a beam superposition mode using a superposed beam generated by superposing a plurality of unitary beams of a first node according to a predetermined trigger condition and a channel state of a second node, selecting one or more best beams from the plurality of unitary beams when there is a determination not to enable the beam superposition mode, and controlling beamforming coefficients when there is a determination to enable the beam superposition mode; and a beamforming unit for transmitting or receiving a signal for the MS through the selected best beam, forming a superposed beam generated by superposing the plurality of unitary beams according to the beamforming coefficients, and transmitting a signal for the second node through the superposed beam.

In accordance with another aspect of the present disclosure, a method of receiving a signal using beamforming in a wireless communication system is provided. The method includes: determining whether to enable a beam superposition mode of a first node using a superposed beam generated by superposing a plurality of unitary beams of the first node according to a predetermined trigger condition and a channel state measured by a second node; measuring channel qualities of the plurality of unitary beams of the first node and selecting one or more best beams based on the channel quality measurements when there is a determination not to enable the beam superposition mode; reporting Channel Quality Information (CQI) indicating a channel quality measurement of the selected best beam to the first node; estimating an overall channel quality measurement of a predetermined number of adjacent unitary beams when there is a determination to enable the beam superposition mode; and reporting second CQI indicting the overall channel quality measurement of the adjacent unitary beams to the first node.

In accordance with another aspect of the present disclosure, an apparatus for receiving a signal using beamforming in a wireless communication system is provided. The apparatus includes: a beamforming controller for determining whether to enable a beam superposition mode of a first node using a superposed beam generated by superposing a plurality of unitary beams of the first node according to a predetermined trigger condition and a channel state measured by a second node, measuring channel qualities of the plurality of unitary beams of the first node and selecting one or more best beams based on the channel quality measurements when there is a determination not to enable the beam superposition mode, and estimating an overall channel quality measurement of a predetermined number of adjacent unitary beams when there is a determination to enable the beam superposition mode; and a transmitter for reporting first Channel Quality Information (CQI) indicating a channel quality measurement of the selected best beam to the first node and reporting second CQI indicating the overall channel quality measurement of the adjacent unitary beams to the first node.

MODE FOR CARRYING OUT THE DISCLOSURE

Figure 1:
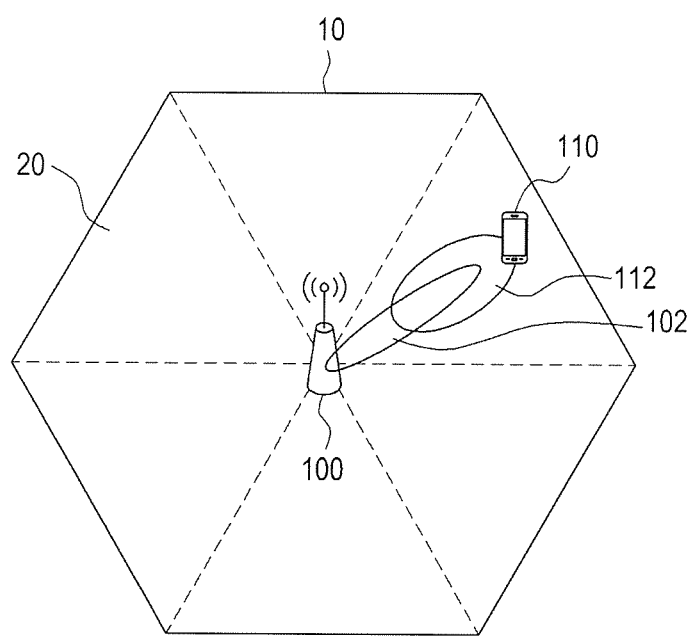
FIG. 1 illustrates an example of a scenario of beamforming-based signal transmission/reception according to an embodiment of the present disclosure.

Hereinafter, an exemplary embodiment of the present disclosure will be described with reference to the accompanying drawings. Further, in the following description of the present disclosure, a detailed description of known functions and configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definitions of the terms should be determined based on the contents throughout the specification.

A technology for superposing narrow beams of a basic unit having specific beam characteristics (e.g., a beam width and a beam gain) in a beamforming-based wireless mobile communication system will be disclosed. The narrow beams of the basic unit may be superposed in a plurality of adjacent directions based on mobility of a user and a change characteristic of a channel state. For example, in a hybrid beamforming structure including a combination of analog beamforming and digital beamforming, reliability can be improved by superposing a plurality of adjacent unitary beams having specific beam characteristics to increase a beam width to be used for actual signal transmission/reception. Here, the unitary beam may be referred to as a narrow beam in that the unitary beam has a relatively narrower beam width in comparison with a superposed beam. The superposed beam is a wide beam or a broad beam having a relatively wider beam width in comparison with the unitary beam.

A conventional technology such as Wireless Gigabit (Wi-Gig) does not support Multiple Input Multiple Output (MIMO) using multiple transmission/reception antennas, and basically operates beamforming by an analog array through a plurality of RF/antenna devices via one Radio Frequency (RF) path. The beamforming may be operated by selecting and feeding back one beam having the strongest signal received at the receiving side. Such a technology can be applied mainly to an indoor environment which generally has a Line of Sight (LoS) channel path of at a proximity distance of several meters without mobility. However, in an outdoor wireless mobile communication in which a channel state is rapidly changed by a Non-LoS (NLoS) path characteristic or channel fading due to mobility of several km/h, quick rotation of the MS, or an obstacle, sensitivity according to large performance deterioration under a user environment may be increased through operation of beamforming in a narrow beam width which maximizes a beam gain in a particular direction and has directivity alone.

Meanwhile, one or more different beam widths are simply used without considering the beamforming structure or problems of system operation. However, in this case, separate reference signals are required to estimate respective channel states of different beam widths in different directions, and overhead increases according to transmission/reception of the reference signals. Further, complexity increases due to a separate channel state estimating process for each reference signal, and another problem about the complexity occurs in which different beam widths require separate reference signals and symbol/frame structures, respectively. In addition, the complexity is increased due to different designs for different analog/digital beamforming coefficients for operating different beam widths, storage and operation of tables for the different designs, and variable operations according to the beam width of a beamforming structure.

Accordingly, in the present invention described below, adjacent unitary beams are superposed and operated as one wide beam according to a given beam superposition condition in a beamforming-based wireless mobile communication system, which operates a plurality of unitary beams having a relatively narrow beam widths. According to the present invention, since unitary beams having the same beam characteristic are used, the reliability of beamforming can be improved without an increase in complexity due to the beamforming and transmission/reception of a reference signal in comparison with a beamforming structure operating a plurality of beams having different beam widths.

FIG. 1 illustrates an example of a scenario of beamforming-based signal transmission/reception according to an embodiment of the present disclosure. Here, a structure of transmitting/receiving signals between two communication nodes using beamforming will be described. The communication nodes may be, for example, a Base Station (BS) and an MS.

Referring to FIG. 1, a BS 100 has one cell 10 and a service area including one or more sectors 20 corresponding to the cell 10. The number of sectors 10 included in one cell 10 may be one or more. A multi-beam may be operated according to each cell or each sector 20. In order to support one or more MSs while acquiring a beamforming gain, the BS 100 forms one or more transmission beams/reception beams for downlink/uplink while simultaneously or sequentially sweeping the transmission beams/reception beams in different directions. For example, the BS 100 simultaneously forms N reception beams directing in N directions during N slots. In another example, the BS 100 sequentially forms N reception beams directing in N directions during N slots while sweeping them. Specifically, a first beam is formed only in a first slot, a second beam is formed only in a second beam, an $i^{th}$ beam is formed only in an $i^{th}$ slot, and an $N^{th}$ beam is formed only in an $N^{th}$ slot.

Due to a structural limitation of the MS 110, MS 110 generally operates a wider beam width supporting a smaller beam gain compared to the BS 100. In some implementations, the MS 110 can support one or more reception beams/transmission beams for downlink/uplink.

Each of the BS 100 and the MS 110 may select an best beam directed in the direction of a correspondent station from one or more beams and transmit/receive a signal through the selected beam.

Figure 2:
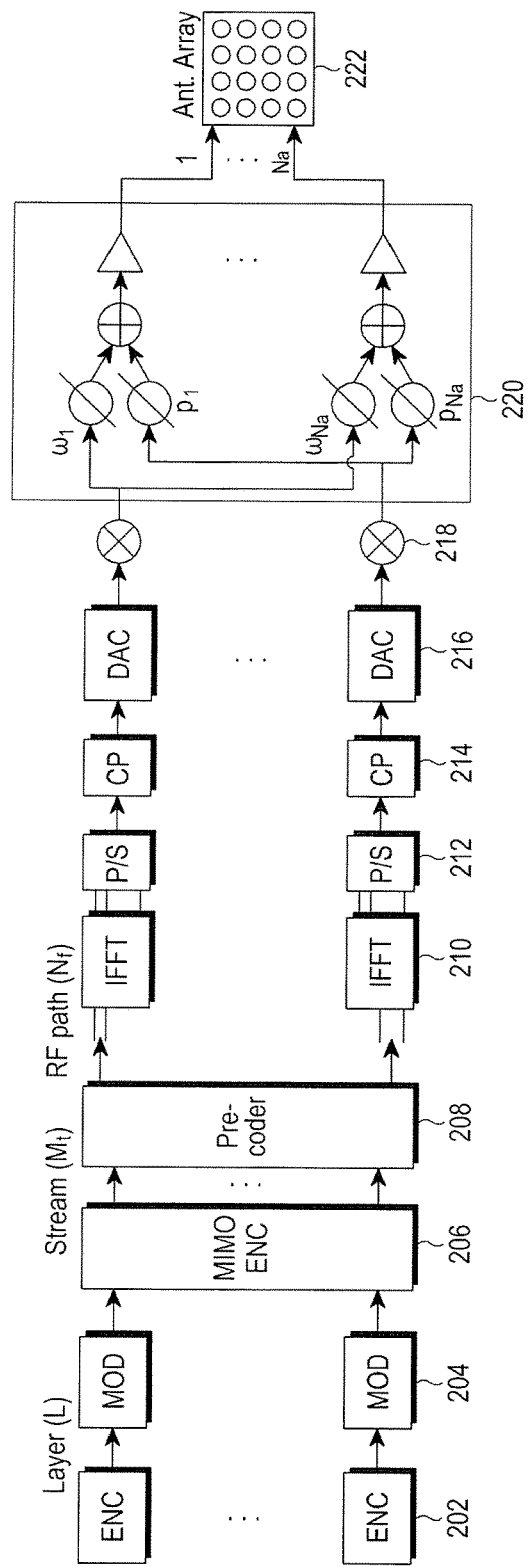
FIG. 2 is a block diagram illustrating a physical layer (PHY) of a transmitting side of a BS for supporting beamforming according to an embodiment of the present disclosure.

FIG. 2 is a block diagram illustrating a physical layer (PHY) of a transmitting side of the BS for supporting beamforming according to an embodiment of the present disclosure. Here, a hybrid structure of simultaneously applying analog beamforming and digital beamforming will be described as an example.

Referring to FIG. 2, L digital signals corresponding to L layers are input to a MIMO encoder 206 via an encoder (ENC) 202 and a modulator (MOD) 204 for each layer, and Mt streams output from the MIMO encoder 206 are pre-coded by a precoder 208 and modulated to Nf pre-coded signals corresponding to Nf RF paths. Each of the pre-coded signals is output through RF paths including IFFT 210, a Parallel to Serial converter (P/S) 212, a Cyclic Prefix (CP) inserter unit 214, and a Digital to Analog Converter (DAC) 216. Bands of the signals output from the RF paths are converted into RF bands through a frequency converter 218, and then the signals are input into an analog beamforming unit 220.

The analog beamforming unit 220 controls the input RF signals to have phases and amplitudes for a plurality of antenna elements through a plurality of phase shifters and Power Amplifiers (PA)/Variable Gain Amplifier (VGA), so as to form beams transmitted in a particular direction. The formed beams are transmitted through an antenna array 222 configured by grouping a plurality of antenna elements to increase a beamforming gain.

Further, through digital beamforming by RF paths including the IFFT 210 before the DAC 216, and the MIMO encoder 206 and the precoder 208, functions of securing an additional beamforming gain, operating multiple users, selectively allocating a frequency band, and forming multiple beams may be acquired. The structure shown in FIG. 1 may be changed to various forms through modification and combination of a plurality of blocks.

The beams formed based on the hybrid beamforming structure may be differently operated according to a channel characteristic of a reference signal/data channel/control channel, in consideration of mobility of the MS or a channel state, or based on an uplink (UL)/downlink (DL) or transmit/receive. Each beam is generated by controlling beamforming coefficients of an analog/digital port to have a specific beam width in a particular direction, a beam direction, and a beam gain. At this time, when antenna input power is equally configured, a correlation may be established in which, as beam width becomes is wider, a maximum beam gain for a direction of the corresponding beam becomes smaller.

In the hybrid beamforming structure, the analog beamforming unit 220 controls a phase and a magnitude weight for each antenna element to uniformly form beams having a specific beam gain in a plurality of directions, so as to span or cover a cell or sector of the BS. Beam widths and beam directions of a plurality of beams are configured to have the same maximum beam gain in a particular direction. In the embodiment of the present disclosure, each beam corresponds to a unitary beam having specific beam characteristics (e.g., a beam width and a beam gain).

In one embodiment, the analog beamforming unit 220 forms unitary beams by controlling beamforming coefficients related to a phase and a magnitude weight for each antenna element such that beams actually having the same Half Power Beam-Width (HPBW) are steered in different directions covering the cell/sector. For example, the analog beamforming unit 220 configures a non-uniform beam weight for each antenna element to make the beams in different directions have the same HPBW.

In another embodiment, the analog beamforming unit 220 may form a plurality of beams, which actually do not have entirely the same HPBW but have the same beam gain (array gain) in a particular direction, to have the uniform wave number in a beam space. For example, the analog beamforming unit 220 may form beam sets in different directions having the same gain orthogonal to a column of a Digital Fourier Transform (DFT) matrix of a size proportional to the number of antenna elements.

According to an embodiment of the present disclosure, some unitary beams may be superposed to be one superposed beam under a predetermined condition. With respect to the unit analog beams formed through the beamforming of the analog port based on the analog-digital hybrid beamforming structure, the superposition of the unitary beams may be performed by combining, in the digital port, analog beams mapped to the RF path of the digital port. In one embodiment, a unitary beam in a particular direction may be mapped to one RF path, and thus the number of unitary beams which can overlap is limited by the number (Nf) of RF paths according to the beamforming structure and a maximum beam width of the superposed beam formed through the superposition of the unitary beams is determined by a beam width of each unitary beam and the number of RF paths at a transmitting side.

Specifically, the analog beamforming unit 220 may form unitary beams having specific beam widths and beam gains by controlling coefficients corresponding to array antenna weights and give an offset to a value corresponding to a wave number to steer each of the unitary beams.

Figure 3:
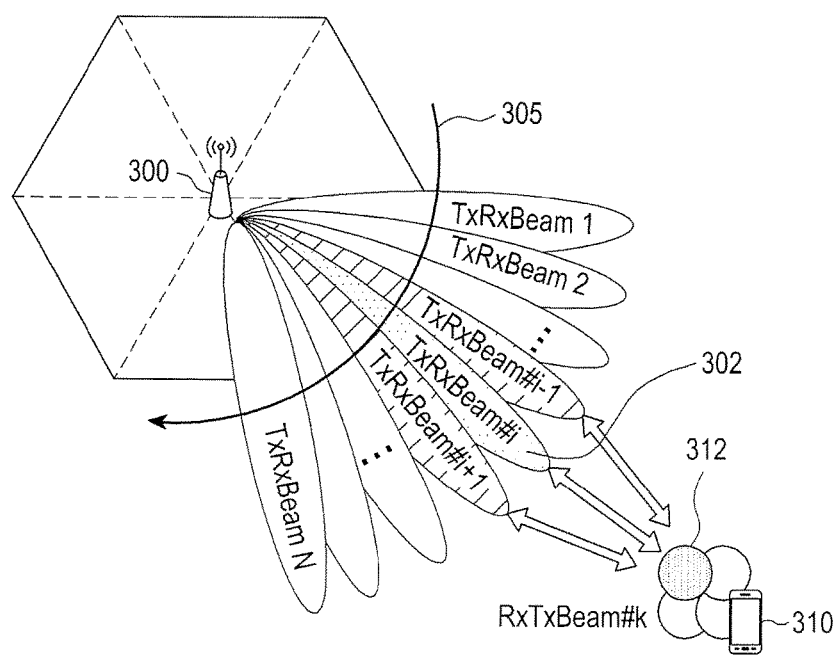
FIG. 3 illustrates an example of a scenario of beamforming-based communication between a BS and an MS according to an embodiment of the present disclosure.

FIG. 3 illustrates an example of a scenario of beamforming-based communication between a BS and an MS according to an embodiment of the present disclosure.

Referring to FIG. 3, a BS 300 simultaneously or successively sweeps and transmits a plurality of beamformed signals. In some implementations, an MS 310 may receive an omnidirectional signal without support of reception beamforming, support one specific beamforming pattern at a time with support of reception beamforming, or simultaneously support a plurality of beamforming patterns in different directions with support of reception beamforming.

When the MS does not support the reception beamforming, the MS 310 measures channel quality of a reference signal transmitted from each of the transmission beams of the BS and selects one or more best beams 302 for the MS 310 from a plurality of transmission beams of the BS based on a result of the measurement. Information on the selected best beam 302 and Channel Quality Information (CQI) on the selected best beam 302 are reported to the BS 300.

When the MS supports reception beamforming, the MS 310 measures channel qualities of a plurality of transmission beams of the BS according to each of the reception beam patterns of the MS 310, and reports a result of the measurement for all combinations of the BS transmission beams 302 and the MS reception beams 312 or some of the combinations at a high rank. The BS 300 allocates a proper transmission beam to the MS based on the report by the MS 310. When the MS 310 can simultaneously receive a plurality of BS transmission beams or support combinations of BS transmission beams and MS reception beams, the BS 300 may select one or more beams in consideration of transmission diversity through repetitive transmission or simultaneously transmission.

Unitary beams for the analog beamforming have specific beam characteristics configured to cover the cell/sector of the BS and are formed to direct different directions. In the case of downlink, the BS may transmit a signal through one best transmission beam for the MS among a plurality of transmission beams or transmit a signal through a wider beam (hereinafter, referred to as a superposed beam) corresponding to superposition of unitary beams to increase beam robustness based on mobility of the MS or estimation of a channel state change. Each unitary beam or the superposed beam may be used to transmit data traffic or transmission of a control signal.

Referring to an example of FIG. 3, the BS 300 selects an ith beam 302 for the MS 310 and transmits the same signal to the MS 310 by simultaneously and additionally using an i−1th beam and an i+1th beam at both sides of the ith beam 302. That is, by superposing three unitary beams, a superposed beam having a wider beam width is formed. The maximum number of superposed unitary beams is limited according to the number of RF paths of the BS 300. Actually, the number of beams, which are to be superposed, required for robust beamforming with respect to a channel variation is determined based on mobility of the MS or a channel state change. For example, the MS or the BS may superpose a predetermined number of unitary beams such that an average or a standard deviation for a channel measurement value such as a Carrier to Interference and Noise Ratio (CINR)/Receive Signal Strength Indicator (RSSI) satisfies a particular threshold condition.

Figure 4:
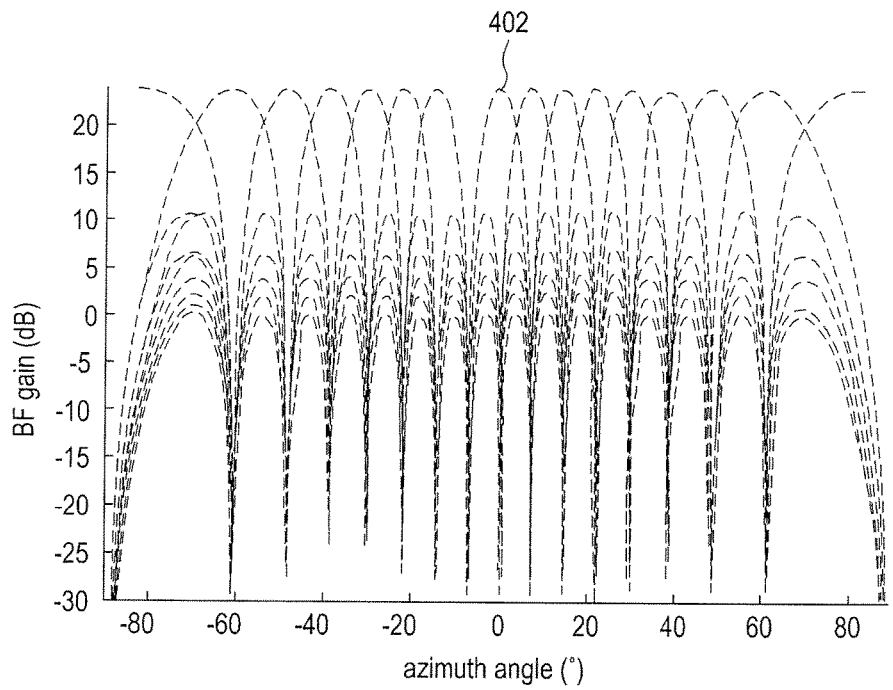
FIG. 4 illustrates an example of a plurality of unitary beams.

FIG. 4 illustrates examples of a plurality of unitary beams.

Referring to FIG. 4, in a 16×1 Uniform Linear Array (ULA) antenna structure, a plurality of unitary beams 402 are formed to divide a sector of 180 degrees into 16 beam areas having a uniform wave number based on a beam coefficient such as a DFT matrix. Each unitary beam has the same maximum beam gain in a particular direction and uniformly supports all sections of the 180 degree are within the same beam gain range.

Figure 5:
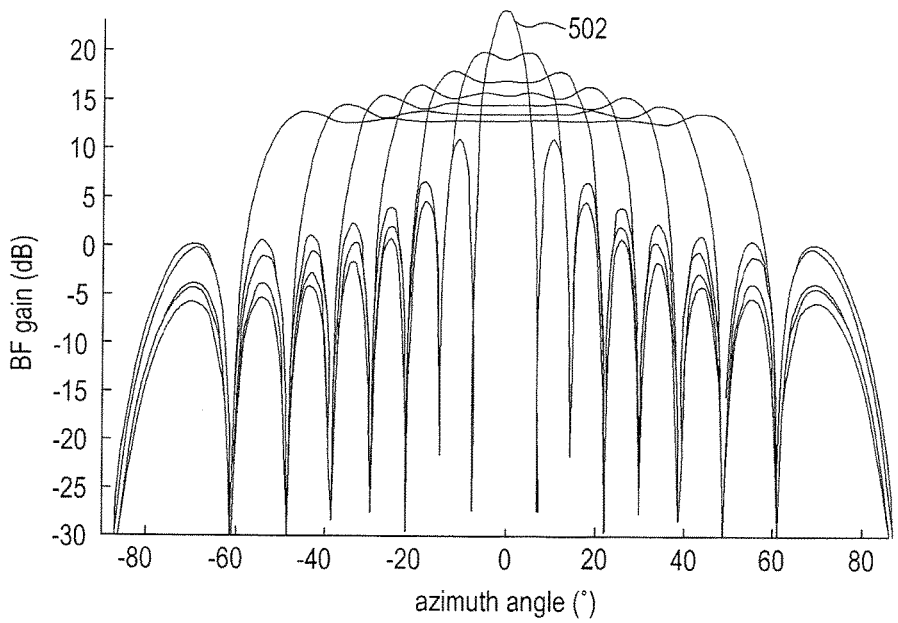
FIG. 5 illustrates examples of beam patterns of superposed beams according to an embodiment of the present disclosure.

FIG. 5 illustrates examples of beam patterns for superposed beams according to an embodiment of the present disclosure. In FIG. 5, beam patterns 502 of superposing beams to which both side adjacent unitary beams of each of the unitary beams of FIG. 4 based on a direction of 0 degrees are added are illustrated.

Referring to FIG. 5, each of the beam patterns 502 for the superposed beams is normalized for a beamforming coefficient according to the number of superposed beams such that gains of all antennas are the same in the analog port.

Under the influence of the normalization, as directivity of the superposed beam in a particular direction is reduced, a beam width increases but a maximum beam gain in the particular direction decreases. Accordingly, it is preferable to configure the number of superposed unitary beams in consideration of the directivity and trade-off of the beamforming gain. In addition, in consideration of the decrease in the beam gain of the superposed beam, link adaptation including configuration of a Modulation and Coding Scheme (MCS) level may be performed. In other words, the link adaptation is performed to compensate for the decrease in the beamforming gain which may be generated due to the use of the superposed beam.

Forming the superposed beam, that is, the beam superposition may be performed when it is determined that the improvement of reliability for the beamforming is needed according to mobility of the MS and/or a channel state. A transmitter (the BS in the case of downlink and the MS in the case of uplink) forms a wider beam, that is, an overlapping beam by superposing one or more unitary beams adjacent to the selected unitary beam. A beam superposition mode means a mode of transmitting a signal by using a superposed beam and is distinguished from a unitary beam mode (that is, a single narrow beam mode) using one selected unitary beam. A trigger condition for defining enabling/disabling of the beam superposition mode may be defined by comparisons between a channel quality threshold for a predetermined time, and channel quality of a superposed beam and channel quality of one selected best unitary beam. Here, channel quality refers to an average and/or a standard deviation of the channel measurement such as a CINR/RSSI. In order to determine the trigger of the beam superposition mode, the MS may periodically feedback or event-trigger report metrics such as an estimated value of a Doppler speed and an average/standard deviation of a CINR/RSSI to the BS.

When the trigger of the beam superposition mode is determined, the transmitter determines the number of beams to be superposed and selects beams to be superposed. In one embodiment, the transmitter considers channel quality in terms of the beam superposition (an average or standard deviation of a CINR/RSSI). The channel quality is reported by a receiver. In an additional embodiment, the transmitter may further consider trade-off between a beam width increase (reliability increase) and a beam gain decrease.

Transition between the unitary beam and the superposed beam by the trigger of the beam superposition mode may be performed according to a trigger condition and report metrics of the beam superposition mode. The beam superposition mode may be triggered by, for example, the BS or the MS. When the beam superposition mode is triggered by the BS, the BS determines whether to execute the beam superposition based on a predetermined trigger condition and report metrics from the MS. When the beam superposition mode is triggered by the MS, the MS determines whether beams are superposed according to a predetermined trigger condition and a result of the measurement of the channel quality, and makes a request for turning on/off the beam superposition to the BS.

As another embodiment, in downlink beamforming, the MS may determine whether reception beams of the MS are superposed according to a predetermined trigger condition and a result of the measurement of the channel quality for a combination of the BS transmission beam and the MS reception beam and turn on/off the superposition of the MS reception beams. In uplink beamforming, the BS may make a request for turning on/off the superposition of the MS transmission beams to the MS according to a predetermined trigger condition and a result of the measurement of the channel quality for a reference signal transmitted by the MS for each unit transmission beam of the MS. As another embodiment, in uplink beamforming, the MS determines whether to execute the beam superposition based on a predetermined trigger condition and channel quality feedback from the BS. As another embodiment, in uplink beamforming, the BS may turn on/off the superposition of the reception beams of the BS for uplink based on a predetermined trigger condition and channel quality measurement according to a combination of the MS transmission beams and the BS reception beams.

In order to execute the beam superposition mode, the MS should measure a channel quality of each unitary beam or a superposed beam. The MS may estimate overall channel quality of the superposed beam from a combination of reference signals mapped to respective unitary beams. Alternatively, the MS may combine channel quality measurements of the reference signals mapped to a predetermined number of adjacent unitary beams, so as to estimate the overall channel quality of the superposed beam including the adjacent unitary beams.

Figure 6:
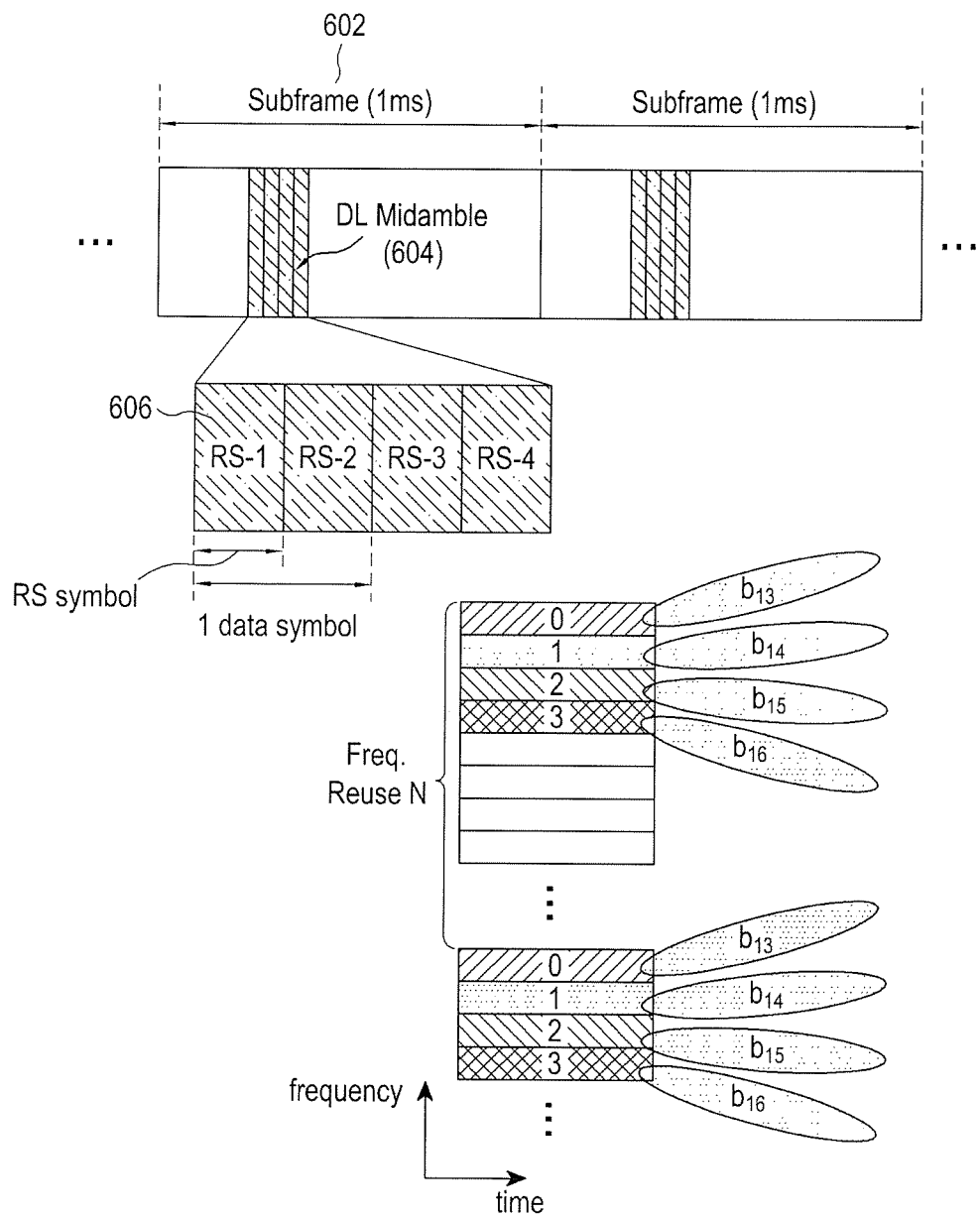
FIG. 6 illustrates an example of a frame structure for reference signal transmission according to an embodiment of the present disclosure.

FIG. 6 illustrates an example of a frame structure for reference signal transmission according to an embodiment of the present disclosure.

Referring to FIG. 6, a subframe 602 of a predetermined time unit (for example, 1 ms) transmits a reference signal 606 through a midamble 604 of a downlink interval in each sector. The reference signal 606 includes a plurality of pilot signals mapped to respective unitary beams in different directions. In the example shown in FIG. 6, the reference signal includes four reference signal symbols RS-1 to RS-4, each of the reference signal symbols includes four pilot signals distinguished by frequencies, and each of the pilot signals is mapped to one unitary beam. For example, the fourth reference signal symbol includes pilot signals mapped to beams b13~b16.

The MS may measure a channel quality of one particular unitary beam from a pilot signal mapped to each unitary beam or estimate channel quality of a superposed beam generated by the superposition of unitary beams from a combination of pilot signals mapped to the unitary beams. The MS measures, updates, and predicts an instant or temporal average/variance/standard deviation) of channel quality metrics such as a CINR or an RSSI based on the measurement (or estimation). As another embodiment, the MS may estimate a channel variation against the time/frequency based on the measurement for the midamble to estimate a mobility value such as a Doppler speed proportional to a movement speed of the MS, and indirectly predict the movement speed of the MS and a sensitivity increase possibility of beams based on the estimated value.

Based on the measurement/estimation of the channel quality, the MS may determine enabling/disabling of the beam superposition mode according to a trigger condition set by the BS, make a request for turning the beam superposition mode on/off by using a UL Media Access Control (MAC) message or a UL control channel according to a result of the determination, and report channel quality information of each beam related to the execution of the beam superposition mode to the BS.

The BS may determine whether to execute the beam superposition mode for the MS according to the request and report by the MS, and transmit data (or a control signal) through the superposition of a plurality of beams in the beam superposition mode or transmit data (or a control signal) through one particular unitary beam in the unitary beam mode. As another embodiment, the MS may trigger the transition of the beam superposition mode by using a trigger condition for the transition of the beam superposition mode provided by the BS. As another embodiment, the MS may periodically/aperiodically report channel qualities measured/estimated from reference signal for each beam from the BS to the BS and switch the beam superposition mode according to an instruction of the BS according to the trigger condition.

Table 1 below shows one example of beam superposition mode information indicating the trigger condition of the beam superposition mode provided by the BS. The BS may broadcast and/or unicast at least one of the following parameters included in the beam superposition mode information to MSs within the cell periodically and/or according to an event trigger.

TABLE 1

| Parameter | Value |
|---|---|
| Beam Superposition Allocation Threshold | Value in dB unit |
| Beam Superposition Release Threshold | Value in dB unit |
| Beam Superposition Allocation Timer | Value in Subframes or Frame unit |
| Beam Superposition Release Timer | Value in Subframes or Frame unit |
| Max Number of Beams Supported for Superposition | Value in number of unitary beams |

A Beam Superposition Allocation Threshold refers to a value of a dB unit indicating a threshold for a maximum standard deviation of an RSSI/CINR for an individual unitary beam in order to determine the transition from the unitary beam mode to the beam superposition mode. For example, an RSSI/CINR for each beam may be measured for a time of the transition from the unitary beam mode to the beam superposition mode or for a predetermined time. (Threshold of the maximum of the standard deviations of the individual Unitary Beam RSSI/CINR measurements over time to trigger mode transition from single beam to beam superposition)

A Beam Superposition Release Threshold refers to a value of a dB unit indicating a threshold for a maximum standard deviation of an RSSI/CINR for an individual unitary beam in order to determine the transition from the beam superposition mode to the unitary beam mode. For example, an RSSI/CINR for each beam may be measured for a time of the transition from the beam superposition mode to the unitary beam mode or for a predetermined time. (Threshold of the maximum of the standard deviations of the individual Unitary Beam RSSI/CINR measurements over time to trigger mode transition from beam superposition to single beam)

A Beam Superposition Allocation Timer refers to a value of a subframe unit or a frame unit indicating a minimum time required for measuring an average or a standard deviation of the channel measurements for a triggering event of the beam superposition mode. That is, the beam superposition allocation timer indicates the minimum number of subframes/frames required for channel measurement. (Minimum required number of subframes/frames to measure the average and standard deviation for the event of beam superposition triggering.)

A Beam Superposition Release Timer refers to a value of a subframe unit or a frame unit indicating a minimum time required for measuring an average or a standard deviation of the channel measurements for a triggering event of the unitary beam mode. That is, the beam superposition release timer indicates the minimum number of subframes/frames required for channel measurement. (Minimum required number of subframes/frames to measure the average and standard deviation for the event triggering from beam position to single beam) In an embodiment, the beam superposition allocation timer and the beam superposition release timer may be replaced with the same one parameter.

A Max Number of Beams Supported for Superposition refers to the maximum number of adjacent beams which can simultaneously support the MS through the beam superposition. (Maximum number of adjacent beams that could be concurrently supported for an MS with beam superposition) As described above, the maximum number of superposed beams may be limited according to the number of RF paths of the BS.

Figure 7:
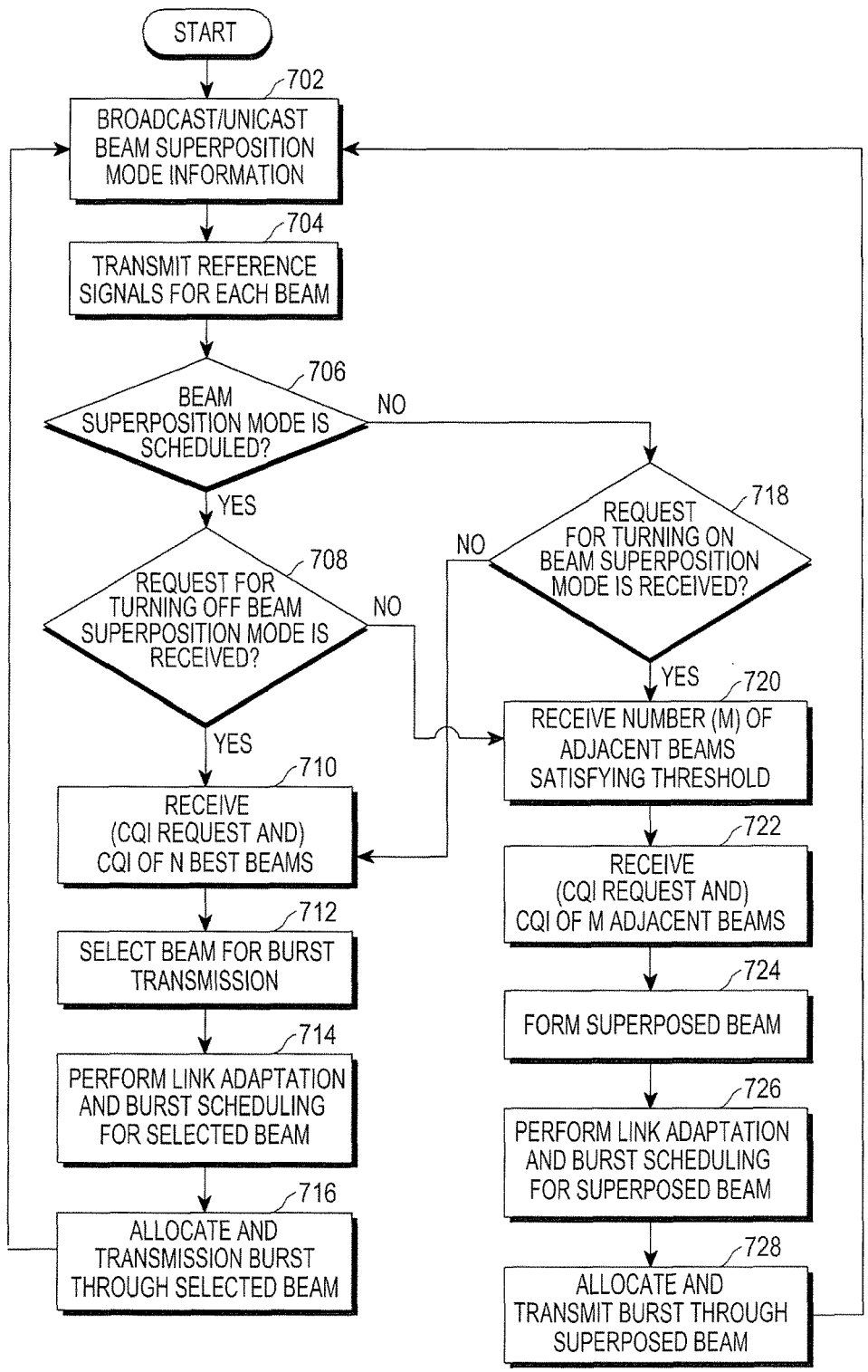
FIG. 7 is a flowchart illustrating an operation of a BS which operates a beam superposition mode according to an embodiment of the present disclosure.

FIG. 7 is a flowchart illustrating an operation of the BS which operates the beam superposition mode according to an embodiment of the present disclosure. Although FIG. 7 illustrates an operation of the BS for downlink transmission beam superposition, it should be noted that an operation of the MS for uplink transmission beam superposition is equally performed.

Referring to FIG. 7, in step 702, the BS broadcasts or unicasts beam superposition mode information to MSs within the cell. In an embodiment, the beam superposition mode information may be inserted into system information and then transmitted. The beam superposition mode information may be transmitted according to a predetermined transmission period of the system information or aperiodically transmitted according to a predetermined triggering condition. The beam superposition mode information corresponds to at least one parameter indicating a trigger condition between the unitary beam mode and the beam superposition mode, and includes at least one of, for example, a beam superposition allocation threshold, a beam superposition release threshold, a beam superposition allocation timer, a beam superposition release timer, and a max number of beams supported for superposition. In step 704, the BS continuously transmits a reference signal for each unitary beam according to a predetermined transmission period of the reference signal so as to allow the MS to measure a channel quality of each unitary beam or each superposed beam.

In step 706, the BS determines whether the beam superposition mode for the MS is determined through scheduling. In an embodiment, the BS may determine whether to execute the beam superposition mode for the MS by performing scheduling according to a predetermined scheduling period. In another embodiment, the BS may determine whether to apply the beam superposition mode to the MS according to a predetermined determination period of the beam superposition mode or a predetermined triggering condition. The determination of applying the beam superposition mode may be made based on whether there is a downlink data/control signal to be transmitted to the MS, whether the BS and the MS can support the beam superposition, the number beams which can be used by the BS, and the determination of a trigger condition for a channel quality of each beam reported by the MS for a predetermined recent time.

For example, when the standard deviation of RSSI/CINR measurements reported by the MS operating in the unitary beam mode during a beam superposition allocation timer exceeds a beam superposition allocation threshold, the BS enables the beam superposition mode for the MS, that is, makes a determination to activate the beam superposition mode. Further, when the standard deviation of RSSI/CINR measurements reported by the MS operating in the beam superposition mode during a beam superposition release timer exceeds a beam superposition release threshold, the BS cancels the beam superposition mode, that is, disables the beam superposition mode and makes a determination to provide a service in the unitary beam mode.

In an embodiment, a trigger condition of the beam superposition mode used by the BS may be different from a trigger condition used by the MS.

When the BS makes a determination to provide a service to the MS in the beam superposition mode or when the BS has already provided a service to the MS in the beam superposition mode, the process proceeds to step 708. When the BS makes a determination to provide a service to the MS in the unitary beam mode or when the BS has already provided a service to the MS in the unitary beam mode, the process proceeds to step 718.

In step 708, the BS determines whether there is a request for turning off the beam superposition mode from the MS having determined to enable the beam superposition mode. For example, the BS determines whether a UL MAC message or a UL control channel message for making a request to turn off the beam superposition mode is received from the MS. When the MS makes a determination to not use the beam superposition mode, the BS may disable the beam superposition mode regardless of the determination of the BS. When the request for turning off the beam superposition mode is made, the process proceeds to step 710. When there is no request for turning off the beam superposition mode, the process proceeds to step 720.

As a selectable embodiment, the BS may omit the determination in step 706 and determine whether to execute the beam superposition mode according to the request from the MS. That is, instead of determining the beam superposition mode, the BS may proceed to step 710 when receiving the request for turning off the beam superposition mode from the MS, and proceed to step 720 when receiving the request for turning on the beam superposition mode.

As another selectable embodiment, the BS may determine whether to execute the beam superposition mode according to the determination of the BS regardless of the request from the MS. That is, when there is a determination to provide a service to the MS in the beam superposition mode in step 706, the BS proceeds to step 720. When there is no determination to provide a service to the MS in the unitary beam mode in step 706, the BS proceeds to step 710.

As another embodiment, when the beam superposition mode is determined in step 706, the BS may proceed to step 718 to determine whether the request for turning on the beam superposition mode is received from the MS. Further, when the unitary beam mode is determined in step 706, the BS may proceed to step 708 to determine whether the request for turning off the beam superposition mode is received from the MS.

Steps 710 to 716 correspond to the operation of the unitary beam mode. At least some of steps 710 to 716, for example, steps 710 and 712 may be already completed before enabling of the unitary beam mode is determined or may be performed after the unitary beam mode is determined. As a selectable embodiment, the BS may make a request for transmitting CQI for the unitary beam mode to the MS when the unitary beam mode is determined. The CQI for the unitary beam mode may refer to, for example, a signal quality for each of a plurality of beams.

In step 710, the BS receives beam indexes for N beams having high channel qualities among unitary beams of the BS, that is, N best beam indexes and/or CQI of the N best beams from the MS. The number N of beams to be reported may be predetermined or indicated by control information broadcasted from the BS. The CQI may include, for example, a CINR and/or an RSSI for each best beam. In step 712, the BS selects one unitary beam to be used for transmitting a data burst based on the best beam indexes of the MS and the CQI. For example, the BS selects one unitary beam having the highest channel quality for the MS from available unitary beams.

In step 714, the BS performs burst scheduling for determining resource allocation for burst transmission together with a link adaptation operation including an operation for determining an MCS level to be used when the burst is transmitted through the selected unitary beam. In step 716, the BS transmits the data burst to the MS through the selected unitary beam and proceeds to one of steps 702, 704, and 706 according to at least one of predetermined transmission periods.

In step 718, the BS determines whether there is a request for turning on the beam superposition mode from the MS having determined to disable the beam superposition mode. For example, the BS determines whether a UL MAC message or a UL control channel message for making a request for turning on the beam superposition mode is received from the MS. When the MS makes a determination to use the beam superposition mode, the BS may enable the beam superposition mode regardless of the determination of the BS. When the request for turning on the beam superposition mode is made, the process proceeds to step 720. When there is no request for turning on the beam superposition mode, the process proceeds to step 710 for the operation in the unitary beam mode.

Steps 720 to 728 correspond to the operation of the beam superposition mode. At least some of steps 720 to 728, for example, steps 720 and 722 may be already completed before enabling of the beam superposition mode is determined or may be performed after the beam superposition mode is determined. As a selectable embodiment, the BS may make a request for transmitting CQI for the beam superposition mode to the MS when the beam superposition mode is determined. The CQI for the beam superposition mode indicates, for example, signal qualities of a predetermined number of beams or a sum (or average) of signal qualities. That is, the CQI for the beam superposition mode may indicate an average signal quality of a predetermined number of superposed beams.

In step 720, the BS receives information on the number (M) of adjacent beams which satisfy a predetermined threshold from the MS. As a selectable embodiment, step 720 may be omitted, and the BS may recognize the number of beams to be superposed, through step 722. In step 722, the BS receives CQI for one beam having an best channel quality among the unitary beams of the BS, and CQI for M adjacent beams including beams adjacent to the one unitary beam. In addition, the MS may also report beam indexes for the M adjacent beams. For example, when the number of adjacent beams to be superposed and the MS determines that beam #7 of the unitary beams of the BS has the best channel quality, that is, CINR/RSSI, indexes for beams #6, #7, and #8 based on beam #7 and CQI thereof are reported to the BS. CQI may include a signal quality of each of beams #6, #7, and #8 or includes a sum or average of the signal qualities of beams #6, #7, and #8.

In step 724, the BS controls beamforming coefficients of the analog beamforming unit and controls the digital beamforming unit, so as to control the M adjacent beams received in step 722 to be superposed. In a concrete embodiment, the superposition of the unitary beams is performed by mapping unit analog beams generated by the analog beamforming unit to an RF chain/path of the digital unit under the analog-digital hybrid structure. As a selectable or combinable embodiment, the analog beamforming unit configures a value corresponding to a sum of beam coefficients for analog unitary beams to be superposed, as amplitude and phase weights for each antenna element, so that the unitary beams can be superposed. That is, the beam superposition may be performed by reflecting a sum of the amplitude and phase weights for generating the unitary beams and a normalization factor for making all antenna elements have the same power in the analog-digital port.

Referring to a configuration example of FIG. 2, the beam superposition is performed by configuring an analog beam weight corresponding to a gain of a unit analog beam to be superposed on each RF path of the digital port, mapping the same data from the digital beamforming unit to a plurality of RF paths, and transmitting the mapped data.

In step 726, the BS performs burst scheduling for determining resource allocation for burst transmission together with a link adaptation operation including an operation for determining an MCS level to be used when the burst is transmitted through the superposed beam formed through the superposition of the M adjacent beams. In step 728, the BS transmits the data burst to the MS through the formed superposed beam and proceeds to one of steps 702, 704, and 706 according to at least one of predetermined transmission periods.

Figure 8:
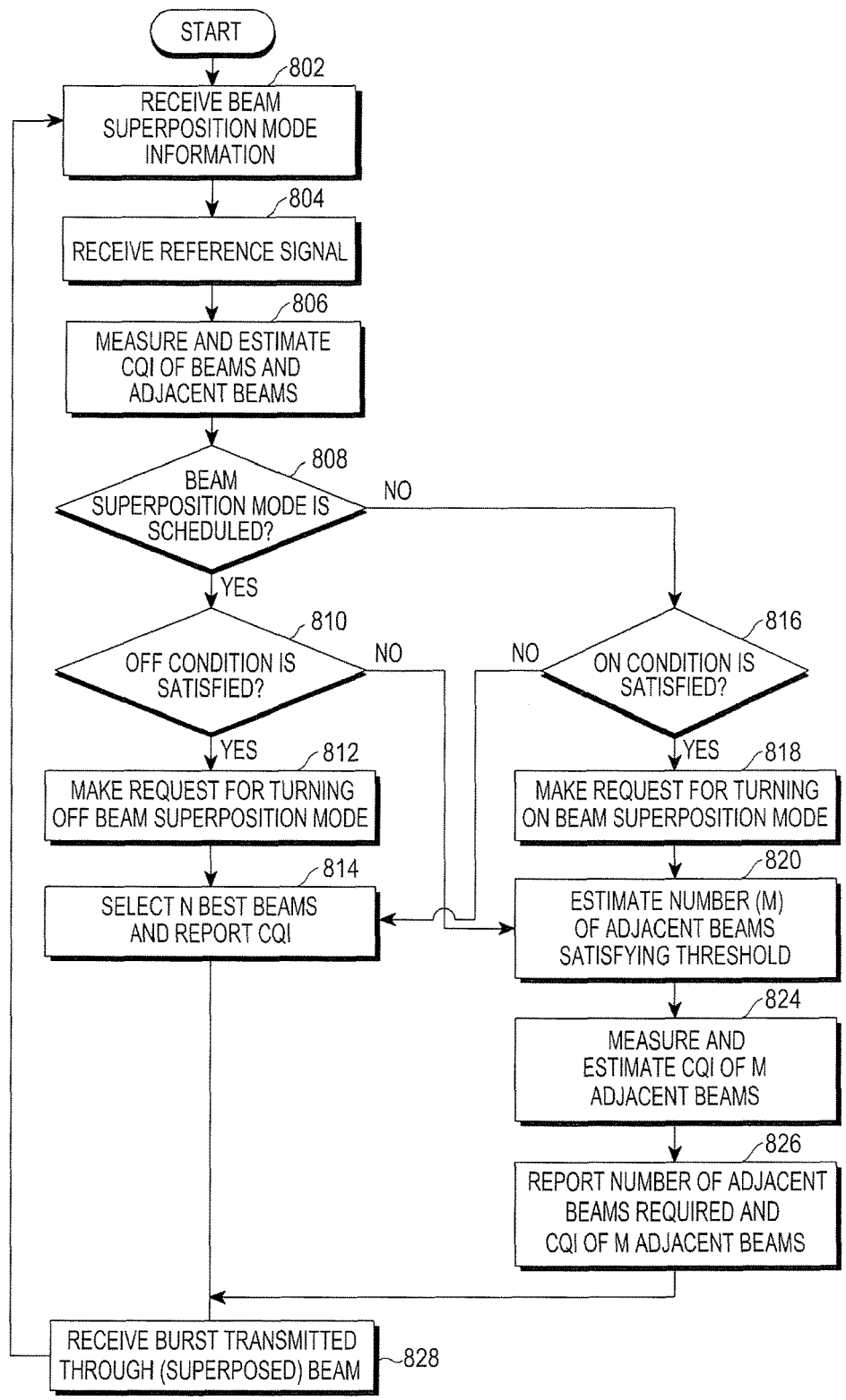
FIG. 8 is a flowchart illustrating an operation of an MS which operates a beam superposition mode according to an embodiment of the present disclosure.

FIG. 8 is a flowchart illustrating an operation of the MS which operates the beam superposition mode according to an embodiment of the present disclosure. Although FIG. 8 illustrates an operation of the MS for downlink reception beam superposition, it should be noted that an operation of the BS for uplink reception beam superposition is equally performed.

Referring to FIG. 8, in step 802, the MS receives beam superposition mode information broadcasted or unicasted from the BS according to a predetermined transmission period of system information. The beam superposition mode information corresponds to at least one parameter indicating a trigger condition between the unitary beam mode and the beam superposition mode, and includes at least one of, for example, a beam superposition allocation threshold, a beam superposition release threshold, a beam superposition allocation timer, a beam superposition release timer, and a max number of beams supported for superposition. In step 804, the MS receives reference signals which are sequentially transmitted for each unitary beam according to a predetermined transmission period of the reference signal or simultaneously transmitted by the BS.

In step 806, the MS measures or estimates channel qualities of unitary beams and adjacent beams based on the reference signal. Specifically, the MS measures a channel quality of each unitary beam and estimates a channel quality of a combination of at least one unitary beam and a predetermined number of adjacent beams which are adjacent to the one unitary beam. The channel quality of the beam combination corresponds to a channel quality of a corresponding superposed beam.

In step 808, the MS determines whether the BS makes a determination to execute the beam superposition mode for the MS based on scheduling information received from the BS. In another embodiment, the MS may receive an indication signal of the beam superposition mode transmitted from the BS according to a predetermined determination period of the beam superposition mode or a predetermined triggering condition, and determine whether the beam superposition mode is determined by the indication signal. When the beam superposition mode is determined or when the beam superposition mode has been already applied, the MS proceeds to step 810. Otherwise, the MS proceeds to step 816.

As a selectable embodiment, the MS may omit step 808 and determine whether to execute the beam superposition mode according to the determination of the MS. That is, instead of receiving the indication of the beam superposition mode from the BS, the MS may determine whether an off condition or an on condition of the beam superposition mode is satisfied. When the off condition is satisfied, the MS proceeds to step 812. When the on condition is satisfied, the MS proceeds to step 818.

As another selectable embodiment, the MS may determine whether to execute the beam superposition mode according to the indication from the BS regardless of the determination of the MS. That is, the MS proceeds to step 820 when the MS is instructed to operate in the beam superposition mode by the BS, and proceeds to step 814 when the MS is instructed to operate in the unitary beam mode by the BS.

As another embodiment, when the beam superposition mode is indicated in step 808, the MS may proceed to step 816 to determine whether the one condition of the beam superposition mode is satisfied. Further, when the unitary beam mode is indicated in step 808, the MS may proceed to step 810 to determine whether the off condition of the beam superposition mode is satisfied.

In step 810, the MS determines whether the off condition of the beam superposition mode is satisfied based on the trigger condition included in the beam superposition mode information received in step 802. For example, when a standard deviation of RSSI/CINR measurements of one best unitary beam or one or more of unitary beams having channel qualities equal to or larger than a particular channel quality during a beam superposition release timer is within a beam superposition release threshold, the MS releases the beam superposition mode, that is, disables the beam superposition mode and decides an operation in the unitary beam mode. As another example, the MS may compare a channel quality (CINR average/standard deviation) for an best single unitary beam and a channel quality of a superposed beam for a predetermined number of adjacent unitary beams based on the best single unitary beam, so as to determine to use a beam mode having a better channel quality.

When the off condition of the beam superposition mode is satisfied, the MS proceeds to step 812 to disable the beam superposition mode and operate in the unitary beam mode. Otherwise, the MS proceeds to step 820.

In step 812, the MS transmits a predetermined message for making a request for turning off the beam superposition mode, for example, a UL MAC message or a UL control channel message to the BS. As a selectable embodiment, the MS may receive a CQI request for the unitary beam mode from the BS when the unitary beam mode is determined. The CQI for the unitary beam mode may refer to, for example, a signal quality for each of a plurality of beams.

In step 814, the MS reports beam indexes for N beams having high channel qualities among all unitary beams of the BS, that is, N best beam indexes to the BS. The MS may additionally transmit CQI indicating channel qualities of best beams, that is, a CINR and/or RSSI to the BS together with the N best beam indexes. The number N of beams to be reported may be predetermined or indicated by control information broadcasted from the BS.

In step 828, when the scheduling is made according to burst scheduling of the BS, the MS receives a data burst transmitted from the BS through one unitary beam selected from the N beams in step 814. Thereafter, the MS proceeds to one of steps 802, 804, and 808 according to at least one of predetermined transmission periods.

Meanwhile, in step 816, the MS determines whether the on condition of the beam superposition mode is satisfied based on the trigger condition of the beam superposition mode information received in step 802. For example, when a standard deviation of RSSI/CINR measurements of one best unitary beam or unitary beams having channel qualities equal to or larger than a particular channel quality during a beam superposition allocation timer exceeds a beam superposition allocation threshold, the MS makes a determination to enable the beam superposition mode. As another example, the MS may compare channel quality (CINR average/standard deviation) for an best single unitary beam and channel quality of a superposed beam for a predetermined number of adjacent unitary beams based on the best single unitary beam, so as to make a determination to use a beam mode having a better channel quality.

When the on condition of the beam superposition mode is satisfied, the MS proceeds to step 818 to enable the beam superposition mode.

In step 818, the MS transmits a UL MAC message or a UL control channel message for making a request for turning on the beam superposition mode to the BS. As a selectable embodiment, the MS may receive a CQI request for the beam superposition mode from the BS when the beam superposition mode is determined. The CQI for the beam superposition mode indicates, for example, signal qualities of a predetermined number of beams or a sum (or average) of signal qualities.

In step 820, the MS estimates the number (M) of adjacent beams to be superposed. Further, the MS identifies the adjacent beams to be superposed. Information on the estimated number of adjacent beams may be reported to the BS. For example, the MS may select adjacent beams having a channel quality measurement which is larger than a predetermined threshold, and the threshold may be predetermined or signaled from the BS. Further, the MS may determine a value of M within the max number of beams supported for superposition signaled from the BS. In step 824, the MS measures and estimates CQI for M adjacent beams. For example, the MS measures channel qualities of one beam having a best channel quality among all unitary beams of the BS and each of the M adjacent beams including beams adjacent to the one beam and combines channel quality measurement of all adjacent beams, so as to estimate channel qualities of all the M adjacent beams. In step 826, the MS reports overall CQI indicating channel qualities of the M adjacent beams to the BS. In addition, the MS may report indexes of adjacent beams to be superposed and the number (M) of adjacent beams to the BS.

In step 828, when the scheduling is made according to burst scheduling of the BS, the MS receives a data burst transmitted from the BS through the superposed beam generated through the superposition of the M adjacent beams in step 824. Thereafter, the MS proceeds to one of steps 802, 804, and 808 according to at least one of predetermined transmission periods.

In embodiments of FIGS. 7 and 8, an operation in which the BS schedules the beam superposition mode and the MS determines enabling/disabling of the beam superposition mode is illustrated. As another embodiment, the BS may make a determination on the beam superposition mode alone or the MS may make a determination on the beam superposition mode alone.

Figure 9A:
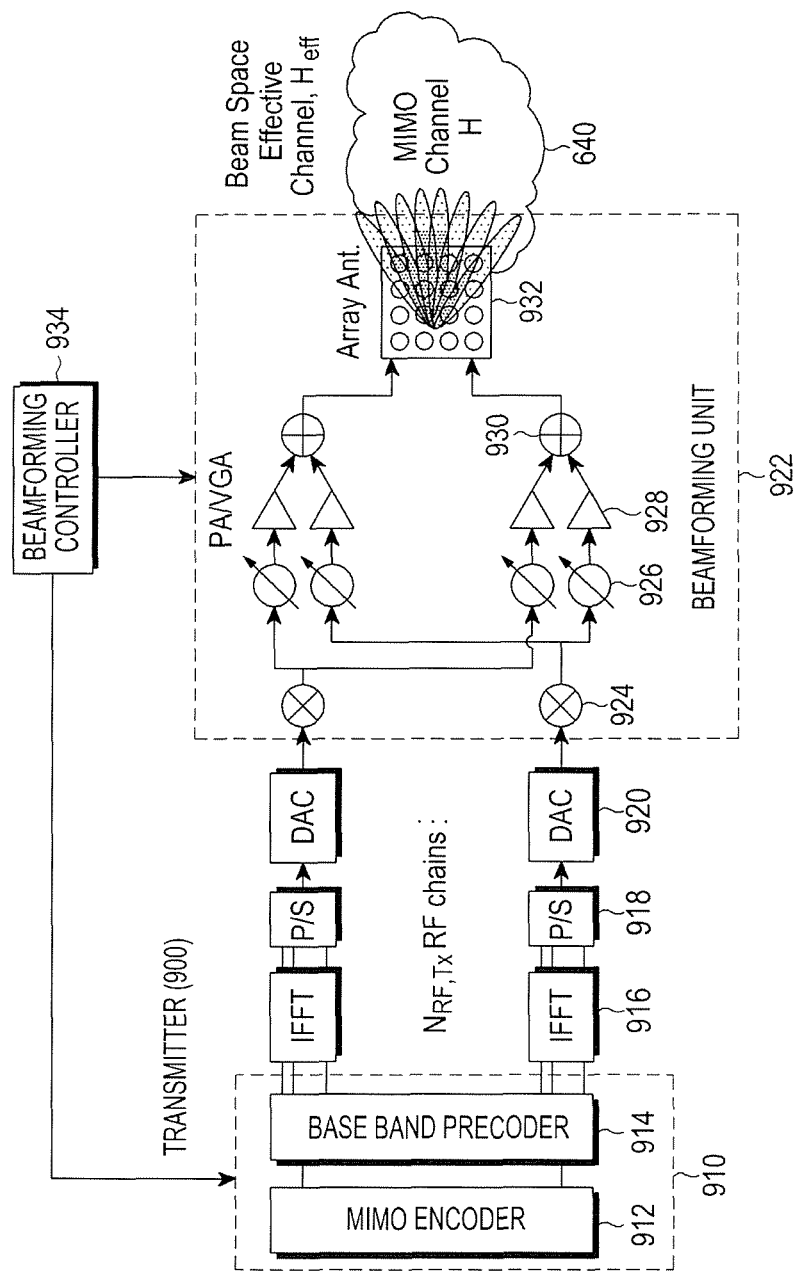
FIG. 9 (including FIGS. 9A and 9B) illustrates an example of a transmission/reception beamforming structure according to an embodiment of the present disclosure.
Figure 9B:
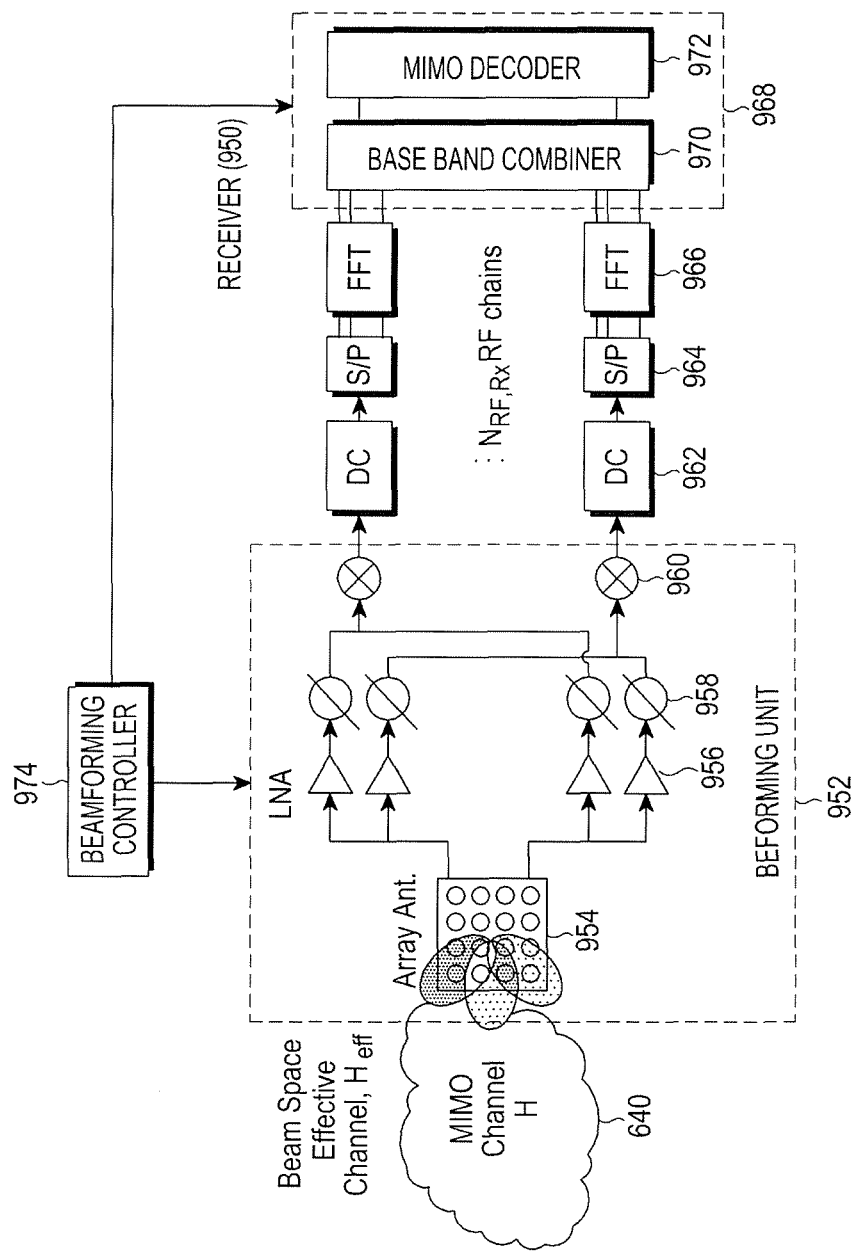

FIG. 9 (including FIGS. 9A and 9B) illustrates an example of a transmission/reception beamforming structure according to an embodiment of the present disclosure.

As illustrated in FIG. 9A, a transmitter 900 includes a digital beamforming unit 910 and an analog beamforming unit 922, and the digital beamforming unit 910 and the analog beamforming unit 922 are connected to each other through NRF, Tx RF paths including an IFFT 916, a P/S 918, and a DAC 920. The digital beamforming unit 910 includes a MIMO encoder 912 and a Base Band (BB) precoder 914, and the analog beamforming unit 922 includes a frequency converter 924, phase shifters/power amplifiers 926 and 928 for each RF path, a combiner 930, and an antenna array 932. In another embodiment, the analog beamforming unit 922 may be defined to have other components except for the frequency converter 924 and the antenna array 932.

The transmitter 900 further includes a beamforming controller 934 for controlling the digital beamforming unit 910 and the analog beamforming unit 922, acquiring pieces of information required for hybrid beamforming and beam superposition, exchanging the pieces of information with the receiver 950, and determining pieces of information required for controlling the digital beamforming unit 910 and the analog beamforming unit 922, for example, a beamforming coefficient matrix. The beamforming controller 934 determines enabling/disabling of the beam superposition mode through a predetermined trigger condition and signaling with a counterpart communication station, that is, the receiver 950, controls beamforming coefficients of the analog beamforming unit according to the determination, and controls RF path mapping of the digital beamforming unit.

Beams formed by the transmitter 900 reach the receiver 950 through a MIMO channel 640 forming a beam space effective channel Heff.

Referring to FIG. 9B, like the transmitter, the receiver 950 includes an analog beamforming unit 952 and a digital beamforming unit 968, and the analog beamforming unit 952 and the digital beamforming unit 968 are connected to each other through NRF, Rx RF paths including an Analog to Digital Converter (ADC) 962, a Serial to Parallel Converter (S/P) 964, and an FFT 966. The analog beamforming unit 952 includes an antenna array 954, Low Noise Amplifiers (LNAs) 956/phase shifters 958, and a frequency converter 960. In another embodiment, the analog beamforming unit 952 may be defined to have other components except for the antenna array 954 and the frequency converter 960. The digital beamforming unit 968 includes a base band combiner 970 and a MIMO decoder 972.

The receiver 950 further includes a beamforming controller 974 for controlling the digital beamforming unit 968 and the analog beamforming unit 952, acquiring pieces of information required for hybrid beamforming and beam superposition, exchanging the pieces of information with the transmitter 934, and determining pieces of information required for controlling the digital beamforming unit 968 and the analog beamforming unit 952, for example, a beamforming coefficient matrix. The beamforming controller 974 determines enabling/disabling of the beam superposition mode through a predetermined trigger condition and signaling with a counterpart communication station, that is, the transmitter 900, controls beamforming coefficients of the analog beamforming unit according to the determination, and controls RF path mapping of the digital beamforming unit.

In downlink, the transmitter 900 corresponds to the BS and the receiver 950 corresponds to the MS. In uplink, the transmitter 900 corresponds to the MS and the receiver 950 corresponds to the BS.

The transmitter 900 forms a plurality of unitary beams, which have directivity through analog beamforming and have specific beam widths in different directions, and generates a superposed beam by superposing a plurality of adjacent beams among the plurality of unitary beams according to a particular trigger condition and/or a request from the receiver 950. The receiver 950 receives and measures reference signals transmitted from the transmitter 900 through the unitary beams, and determines enabling/disabling of the beam superposition mode according to a particular trigger condition and/or a result of the measurement. Further, the receiver 950 may report information (enabling/disabling of the beam superposition mode, channel quality information and the like) required for the operation of the beam superposition mode to the transmitter 900.

Figure 10:
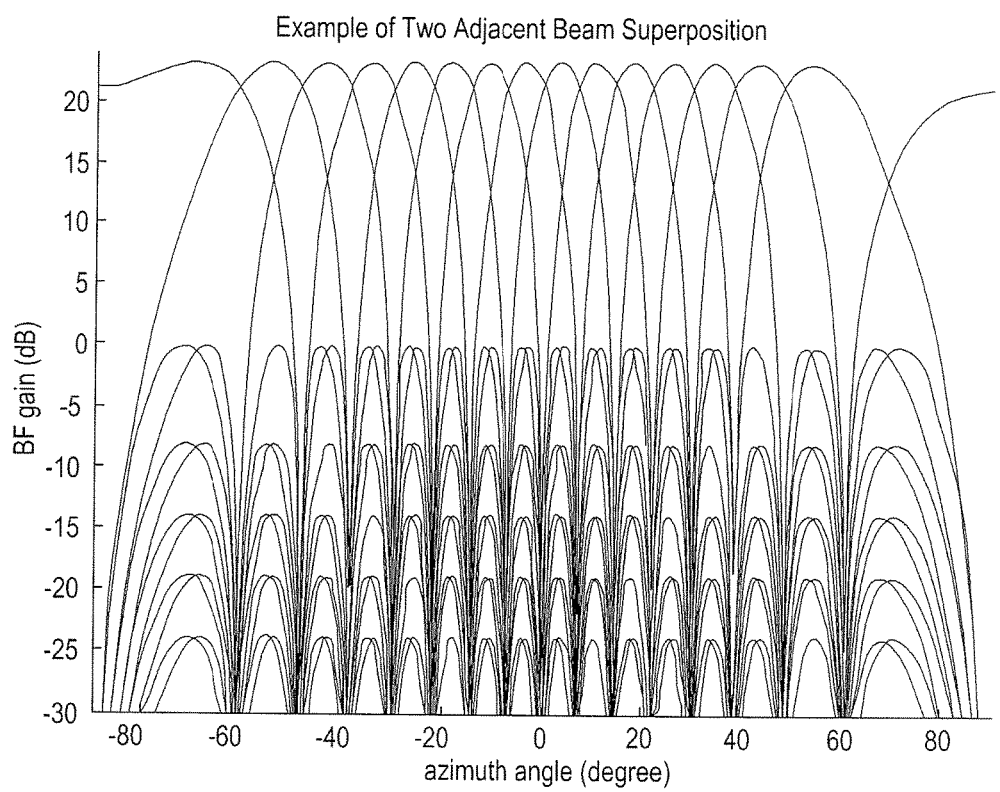
FIGS. 10 and 11 illustrate beam patterns of superposed beams generated by superposing two adjacent beams and three adjacent beams according to an embodiment of the present disclosure.
Figure 11:
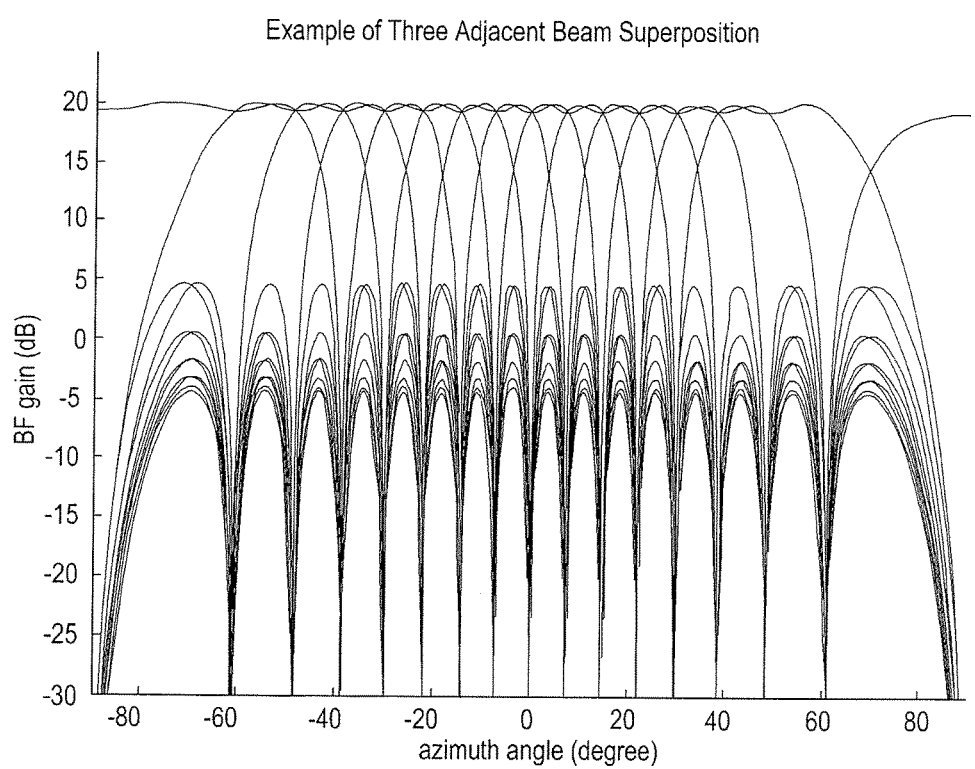

FIGS. 10 and 11 illustrate beam patterns of superposed beams generated by superposing two adjacent beams and three adjacent beams according to an embodiment of the present disclosure. Like in FIG. 5, each of the beam patterns of the superposed beams is normalized for a beamforming coefficient according to the number of superposed beams such that gains of all antennas become the same in the analog port. As illustrated in FIGS. 10 and 11, the superposed beams enable more stable communication through a wider beam width in comparison with the unitary beams illustrated in FIG. 4.

Similar to a case where the BS superposes transmission beams to transmit signals in downlink, the MS may superpose reception beams through reception hybrid beamforming for downlink signals. In this case, the MS determines whether to trigger transmission beam superposition of the BS in view of reception beam superposition of the MS. When the MS can superpose the reception beams, the MS can acquire reliability of a received signal by superposing the reception beams of the MS with respect to one transmission beam of the BS even though mobility of the MS or a channel variation/fluctuation is great. Accordingly, the transmission beam superposition of the BS is not needed.

Further, when the BS operates the transmission beam superposition mode, the MS may determine indexes of beams to be superposed by the BS or the number of beams even in consideration of not only supposition transmission of one or more adjacent transmission beams by the BS but also superposition reception of one or more reception beams by the MS. At this time, the reception beam superposition of the MS may be implemented by superposing adjacent reception beams like the transmission beam superposition of the BS, or implemented by diversity reception of one or more reception beams in different directions by the MS.

Figure 12A:
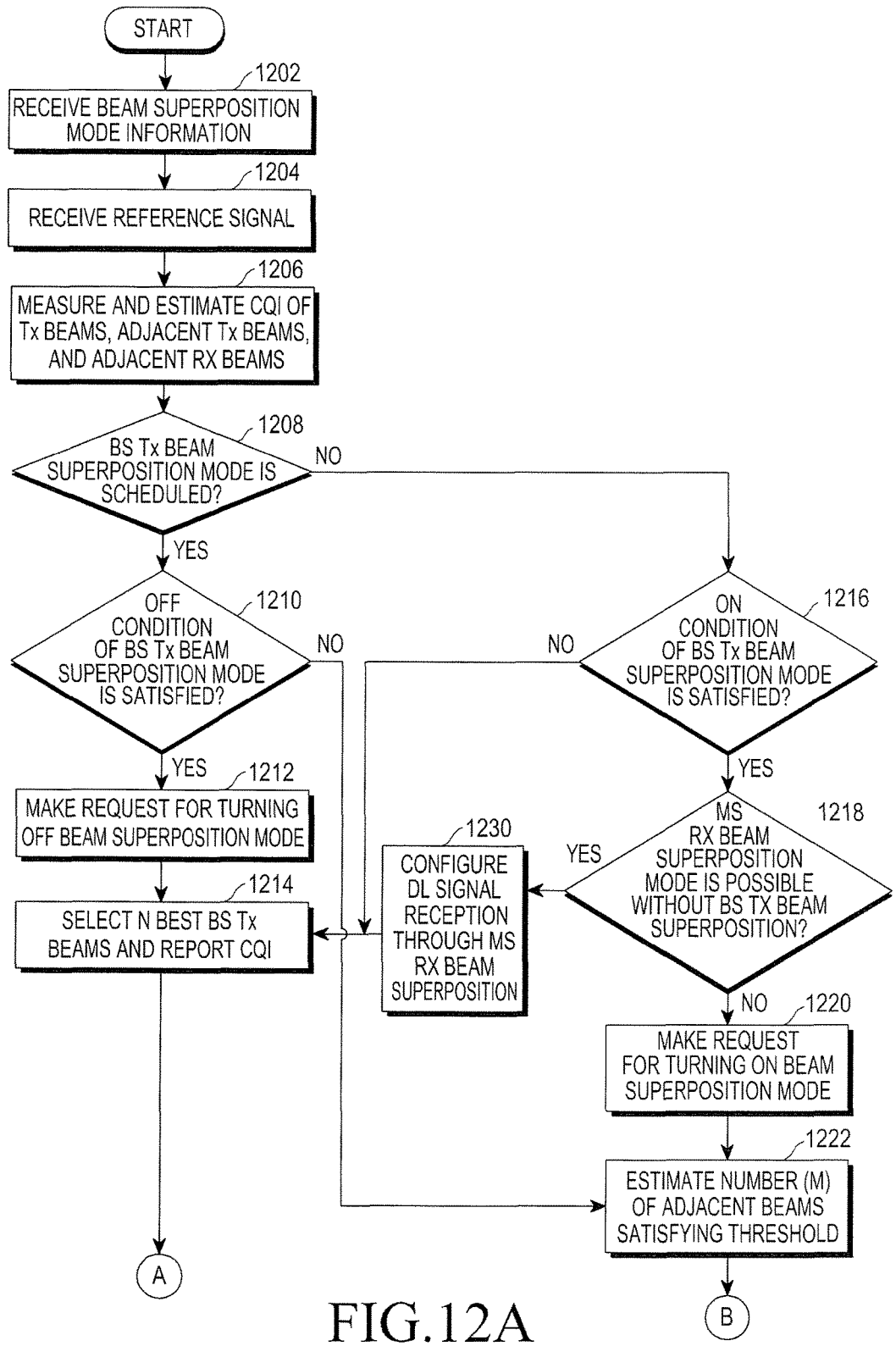
FIG. 12 (including FIGS. 12A and 12B) is a flowchart illustrating an operation of an MS which operates a beam superposition mode according to another embodiment of the present disclosure.
Figure 12B:
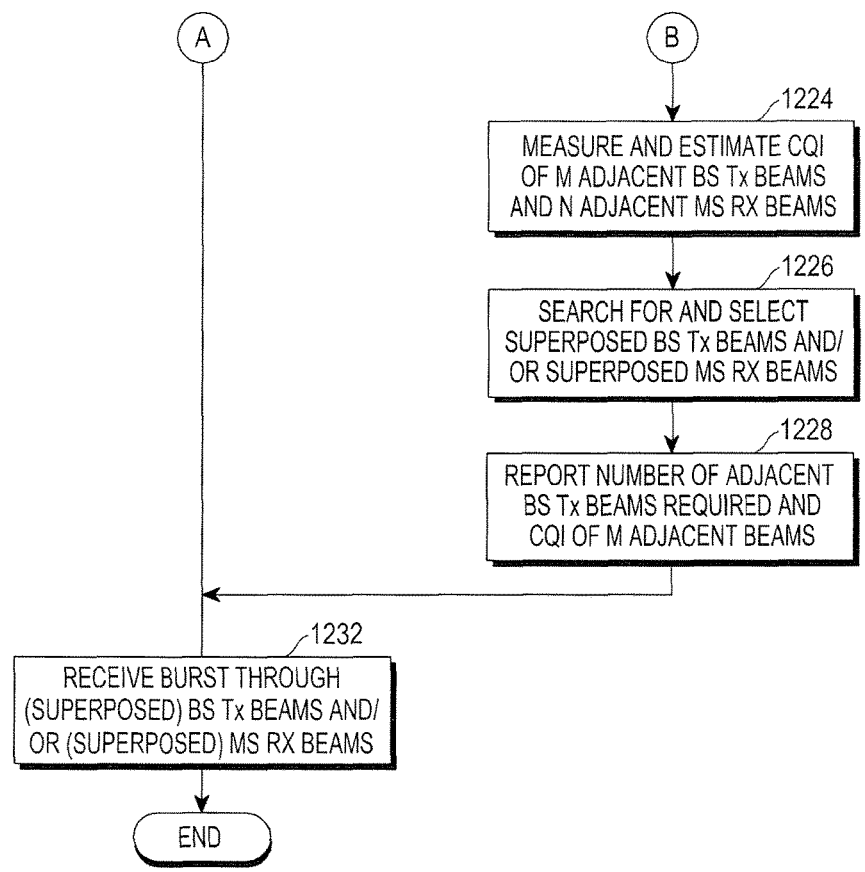

FIG. 12 (including FIGS. 12A and 12B) is a flowchart illustrating an operation of the MS which operates the beam superposition mode according to another embodiment of the present disclosure. Since an operation for downlink beam superposition will be described below, the transmission beam corresponds to the BS transmission beam and the reception beam corresponds to the MS reception beam.

Referring to FIG. 12, in step 1202, the MS receives the beam superposition mode broadcasted or unicasted from the BS. The beam superposition mode information corresponds to a parameter set indicating a trigger condition between the unitary beam mode and the beam superposition mode, and includes at least one of, for example, a beam superposition allocation threshold, a beam superposition release threshold, a beam superposition allocation timer, a beam superposition release timer, and a max number of beams supported for superposition. As another embodiment, the beam superposition mode information may include an entire parameter set indicating a trigger condition of the BS transmission beam superposition mode and a parameter set indicating a trigger condition of the MS reception beam superposition mode. In step 1204, the MS receives reference signals which are sequentially transmitted according to each unitary beam or simultaneously transmitted by the BS.

In step 1206, the MS measures or estimates channel qualities of transmission beams, adjacent transmission beams, or adjacent reception beams. Specifically, the MS measures channel qualities of each transmission beam and each reception beam, and also estimates channel qualities of a combination of at least one higher transmission beam and a predetermined number of transmission beams adjacent to the one higher transmission beam and a combination of at least one higher transmission beam and a predetermined number of reception beams adjacent to the one higher reception beam.

In step 1208, the MS determines whether the BS makes a determination to execute the BS transmission beam superposition mode for the MS based on scheduling information received from the BS. When it is determined that the BS transmission beam superposition mode is used, the MS proceeds to step 1210. Otherwise, the MS proceeds to step 1216.

In step 1210, the MS determines whether an off condition of the BS transmission beam superposition mode is satisfied based on the trigger condition of the beam superposition mode information received in step 1202. In a concrete example, when a standard deviation of RSSI/CINR measurements of one best unitary beam or one or more unitary beams having channel qualities equal to or larger than a particular channel quality during a beam superposition release timer is within a beam superposition release threshold, the MS releases the beam superposition mode, that is, disables the beam superposition mode and makes a determination to operate in the unitary beam mode. When the off condition of the beam superposition mode is satisfied, the MS proceeds to step 1212 to disable the beam superposition mode and operate in the unitary beam mode. Otherwise, the MS proceeds to step 1222.

In step 1212, the MS transmits a message for making a request for turning off the BS transmission beam superposition mode to the BS. In step 1214, the MS reports beam indexes for N transmission beams having high channel qualities among all transmission beams of the BS, that is, N best transmission beam indexes to the BS. The MS may additionally transmit CQI indicating channel qualities of best transmission beams, that is, a CINR and/or RSSI to the BS together with the N best transmission beam indexes. The number N of beams to be reported may be predetermined or indicated by control information broadcasted from the BS.

In step 1232, when the scheduling is made according to burst scheduling of the BS, the MS receives a data burst transmitted from the BS through one transmission beam selected from the N transmission beams in step 1214.

In step 1216, the MS determines whether the on condition of the beam superposition mode is satisfied based on the trigger condition of the beam superposition mode information received in step 1202. In a concrete example, when a standard deviation of RSSI/CINR measurements during the beam superposition allocation timer exceeds the beam superposition allocation threshold, the MS makes a determination to enable the beam superposition mode. When the one condition of the beam superposition mode is satisfied, the MS proceeds to step 1218.

In step 1218, when the MS determines that reliability of a received signal can be acquired through the superposition of reception beams alone without the superposition of transmission beams, that is, when the off condition of the transmission beam superposition mode is satisfied through the superposition of the reception beams alone without the superposition of the transmission beams, the MS makes a determination to execute the reception beam superposition mode without the transmission beam superposition. For example, when mobility of the MS (for example, a Doppler speed) or a channel variation is within a predetermined threshold, the MS may determine that the transmission beam superposition of the BS is not needed. When it is determined that both the transmission beam superposition of the BS and the reception beam superposition of the MS are not performed, the MS configures (controls) the reception beamforming unit of the MS to receive a downlink signal from the BS through the reception beam superposition and proceeds to step 1214.

In step 1218, when the off condition of the transmission beam superposition mode is not satisfied through the reception beam superposition alone without the transmission beam superposition, the MS makes a determination to perform both the transmission beam superposition of the BS and the reception beam superposition of the MS and proceeds to step 1220. In step 1220, the MS transmits a message for making a request for turning on the beam superposition mode to the BS. In step 1222, the MS estimates the number (M) of adjacent beams which satisfy a predetermined threshold. Specifically, the MS may determine the number of adjacent beams having channel quality measurements which exceed a predetermined threshold. In step 1224, the MS measures and estimates CQI for M adjacent transmission beams and N adjacent reception beams. Specifically, the MS measures channel qualities of one transmission beam having the highest channel quality among all transmission beams of the BS and each of the M adjacent transmission beams including beams adjacent to the one transmission beam and combines channel quality measurements of all adjacent transmission beams, so as to estimate channel qualities of all the M adjacent transmission beams. Similarly, the MS measures channel qualities of one reception beam having the highest channel quality among all reception beams of the MS and each of the N adjacent reception beams including beams adjacent to the one reception beam and combines channel quality measurements of all adjacent reception beams, so as to estimate channel qualities of all the N adjacent reception beams.

In step 1226, the MS searches for and selects pair(s) of transmission beams for transmission beam superposition and reception beams for reception beam superposition which satisfy a predetermined reliability criteria. In a concrete example, the MS selects one or more pairs of adjacent transmission beams and adjacent reception beams which have the highest channel qualities. In step 1228, the MS reports the number (M) of adjacent transmission beams required and overall CQI indicating channel qualities of the M adjacent beams to the BS.

In step 1232, when the scheduling is made according to burst scheduling of the BS, the MS receives a data burst transmitted from the BS through the superposed transmission beam generated through the superposition of the M adjacent transmission beams in step 1224, through the superposed reception beam generated through the superposition of the N adjacent reception beams.

Although the superposition of the BS transmission beams and the MS reception beams in downlink has been described above, such an operation or process can be equally applied to the superposition of the BS transmission beams and the MS reception beams in uplink.

Meanwhile, specific exemplary embodiments have been described in the detailed description of the present disclosure, but various changes and modifications may be made without departing from the spirit and scope of the present disclosure. Therefore, the scope of the present disclosure should not be defined as being limited to the embodiments, but should be defined by the appended claims and equivalents thereof.

The invention claimed is:

1. A method for transmitting a signal using beamforming by a base station in a wireless communication system, the method comprising:
   determining to enable a beam superposition based on a first trigger condition that a standard deviation of receive signal strength measurements for at least one unitary beam reported by a mobile station exceeds a beam superposition allocation threshold, the at least one unitary beam being at least one among a plurality of unitary beams corresponding to an array antenna of the base station;
   determining a number of unitary beams to be superposed and selecting the determined number of unitary beams from among the plurality of unitary beams based on at least one predetermined condition related to the beam superposition and channel quality information received from the mobile station, the channel quality information including information about a channel quality measured by the mobile station for a combination of the selected unitary beams;
   configuring the array antenna of the base station to form a superposed beam by superposing the selected unitary beams;
   performing a communication with the mobile station through the superposed beam;
   determining to disable the beam superposition based on a second trigger condition that a standard deviation of receive signal strength measurements for the superposed beam reported by the mobile station exceeds a beam superposition release threshold; and
   performing the communication with the mobile station through one or more unitary beams among the plurality of unitary beams,
   wherein the combination of the selected unitary beams is determined based on beam information transmitted from the base station to the mobile station, and the beam information includes information about a maximum number of unitary beams available to form the superposed beam.

2. The method of claim 1, wherein the channel quality for the combination of the selected unitary beams is measured based on a combination of reference signals mapped to the selected unitary beams, and the reference signals are transmitted on different resources.

3. The method of claim 1, further comprising:
performing link adaptation and burst scheduling for the superposed beam based on the channel quality information.

4. The method of claim 1, further comprising:
estimating channel qualities of at least two transmission beams of the mobile station by using reference signals transmitted through a plurality of unitary transmission beams of the mobile station;
performing link adaptation and burst scheduling for the superposed beam based on the estimated channel qualities; and
transmitting, to the mobile station, results of the link adaptation and the burst scheduling for the superposed beam.

5. The method of claim 1, wherein the maximum number of the unitary beams is limited to a number of radio frequency (RF) chains included in the base station.

6. A base station in a wireless communication system, the base station comprising:
a transceiver; and
at least one processor configured to:
determine to enable a beam superposition based on a first trigger condition that a standard deviation of receive signal strength measurements for at least one unitary beam reported by a mobile station exceeds a beam superposition allocation threshold, the at least one unitary beam being at least one among a plurality of unitary beams corresponding to an array antenna of the base station,
determine a number of unitary beams to be superposed and select the determined number of unitary beams from among the plurality of unitary beams based on at least one predetermined condition related to the beam superposition and channel quality information received from the mobile station, the channel quality information including information about a channel quality measured by the mobile station for a combination of the selected unitary beams,
configure the array antenna of the base station to form a superposed beam by superposing the selected unitary beams,
control the transceiver to perform a communication with the mobile station through the superposed beam,
determine to disable the beam superposition based on a second trigger condition that a standard deviation of receive signal strength measurements for the superposed beam reported by the mobile station exceeds a beam superposition release threshold, and
perform the communication with the mobile station through one or more unitary beams among the plurality of unitary beams,
wherein the combination of the selected unitary beams is determined based on beam information transmitted from the base station to the mobile station, and the beam information includes information about a maximum number of unitary beams available to form the superposed beam.

7. A method for receiving a signal using beamforming by a mobile station in a wireless communication system, the method comprising:
determining to enable an operation for a beam superposition of a base station based on a first trigger condition that a standard deviation of receive signal strength measurements for at least one unitary beam exceeds a beam superposition allocation threshold, the at least one unitary beam being at least one among a plurality of unitary beams corresponding to an array antenna of the base station,
measuring a channel quality for a combination of at least two beams among the plurality of unitary beams of the base station,
transmitting, to the base station, channel quality information including information about the measured channel quality,
performing a communication with the base station using a superposed beam, the superposed beam being formed by superposing the at least two beams based on the channel quality information and at least one predetermined condition,
determining to disable the operation for the beam superposition based on a second trigger condition that a standard deviation of receive signal strength measurements for the superposed beam exceeds a beam superposition release threshold, and
performing the communication with the base station using one or more unitary beams among the plurality of unitary beams,
wherein the combination of the at least two beams is determined based on beam information received from the base station, and the beam information includes information about a maximum number of unitary beams of the base station available to form the superposed beam.

8. The method of claim 7, wherein the channel quality for the combination of the at least two beams is measured based on a combination of reference signals mapped to the at least two beams, and the reference signals are transmitted on different resources.

9. The method of claim 7, further comprising:
receiving results of link adaptation and burst scheduling for the superposed beam; and
transmitting a data signal to the base station through a superposed transmission beam of the mobile station based on the results of link adaptation and burst scheduling.

10. The method of claim 7, wherein a maximum number of the unitary beams is limited to a number of radio frequency (RF) paths chains in the base station.

11. The method of claim 7, further comprising:
in response to determining to perform the operation for the beam superposition of the base station, determining whether to enable a beam superposition of the mobile station with the beam superposition of the base station;
in response to determining to enable the beam superposition of the mobile station with the beam superposition of the base station, estimating channel qualities corresponding to pairs of beams of the base station and beams of the mobile station; and
selecting at least two beams of the base station to be superposed and at least two beams of the mobile station to be superposed based on the channel qualities.

12. A mobile station for in a wireless communication system, the mobile station comprising:
a transceiver; and
at least one processor configured to:
determine to perform an operation for a beam superposition of a base station based on a first trigger condition that a standard deviation of receive signal strength measurements for at least one unitary beam exceeds a beam superposition allocation threshold, the at least one unitary beam being at least one among a plurality of unitary beams corresponding to an array antenna of the base station, measure channel quality for a combination of at least two beams among the plurality of unitary beams of the base station, control the transceiver to transmit, to the base station, channel quality information including information about the measured channel quality, control the transceiver to perform a communication with the base station using a superposed beam, the superposed beam formed by superposing the at least two beams based on the channel quality information and at least one predetermined condition, determine to disable the operation for the beam superposition based on a second trigger condition that a standard deviation of receive signal strength measurements for the superposed beam exceeds a beam superposition release threshold, and control the transceiver to perform the communication with the base station using one or more unitary beams among the plurality of unitary beams, wherein the combination of the at least two beams is determined based on beam information received from the base station, and the beam information includes information about a maximum number of unitary beams of the base station available to form the superposed beam.

13. The base station of claim 6, wherein the channel quality for the combination of the selected unitary beams is measured based on a combination of reference signals mapped to the selected unitary beams, and the reference signals are transmitted on different resources.

14. The mobile station of claim 12, wherein the channel quality for the combination of the at least two beams is measured based on a combination of reference signals mapped to the at least two beams, and the reference signals are transmitted on different resources.

15. The method of claim 1, further comprising:
in response to determining to disable the beam superposition, receiving, from the mobile station, channel quality information for each of at least one unitary beam among the plurality of unitary beams;
selecting one of the plurality of unitary beams based on the channel quality information for each of the at least one unitary beam; and
performing a communication with the mobile station through the selected unitary beam.

16. The base station of claim 6, wherein the processor is further configured to:
in response to determining to disable the beam superposition, control the transceiver to receive, from the mobile station, channel quality information for each of at least one unitary beam of the plurality of unitary beams;
select one of the plurality of unitary beams based on the channel quality information for each of the at least one unitary beam; and
perform a communication with the mobile station through the selected unitary beam.

17. The method of claim 7, further comprising:
in response to determining to disable the operation for the beam superposition, transmitting, to the base station, channel quality information for each of at least one unitary beam selected from the plurality of unitary beams of the base station.

18. The mobile station of claim 12, wherein the at least one processor is further configured, in response to determining to disable the operation for the beam superposition, to transmit, to the base station, channel quality information for each of at least one unitary beam selected from the plurality of unitary beams of the base station.

* * * * *